Jan. 9, 1962 C. J. CHAPLIN 3,016,090
PULP MOLDING MACHINE
Filed June 3, 1957 17 Sheets-Sheet 1

Jan. 9, 1962 C. J. CHAPLIN 3,016,090
PULP MOLDING MACHINE
Filed June 3, 1957 17 Sheets-Sheet 2
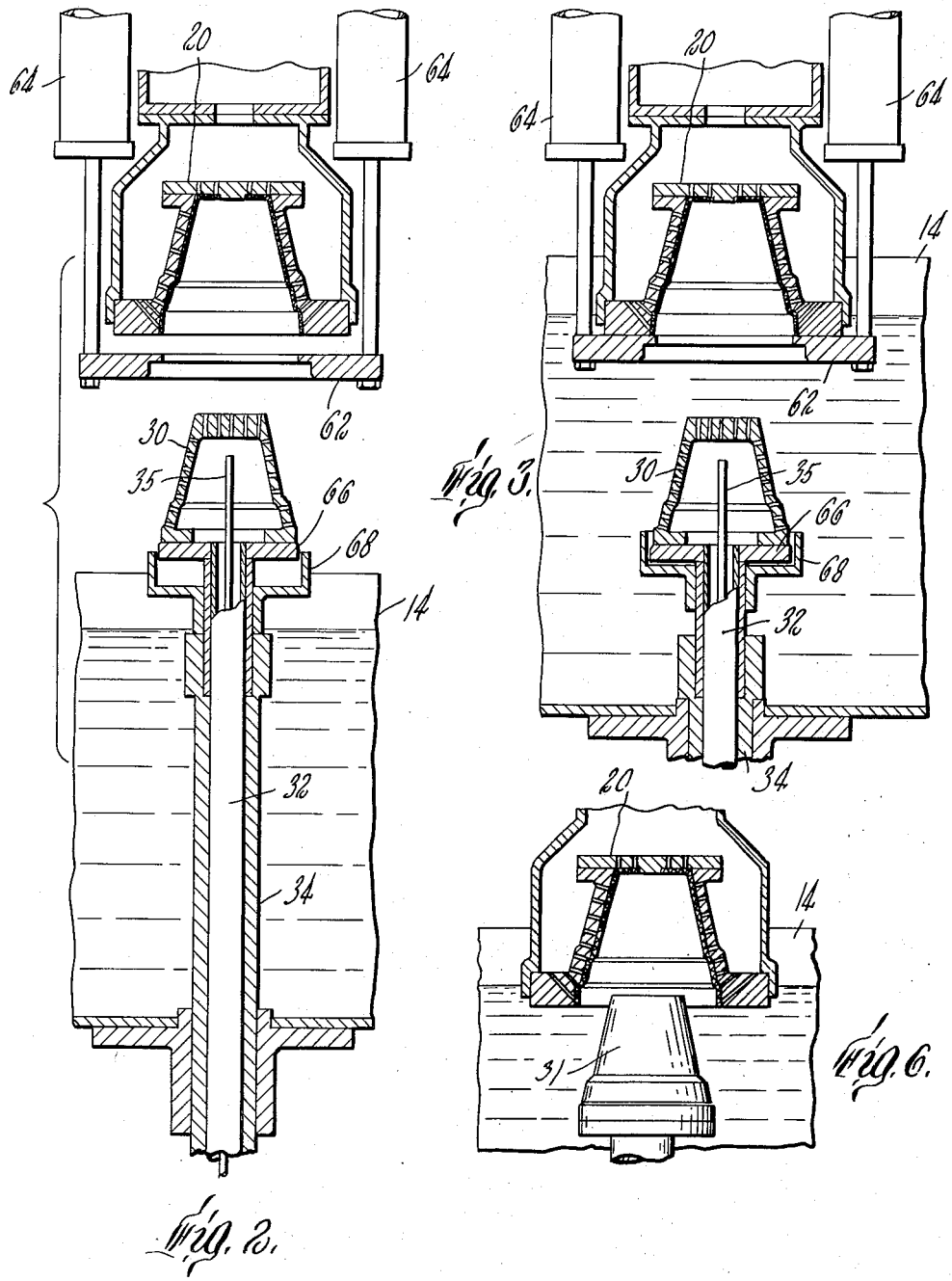

Jan. 9, 1962  C. J. CHAPLIN  3,016,090
PULP MOLDING MACHINE

Filed June 3, 1957  17 Sheets-Sheet 3

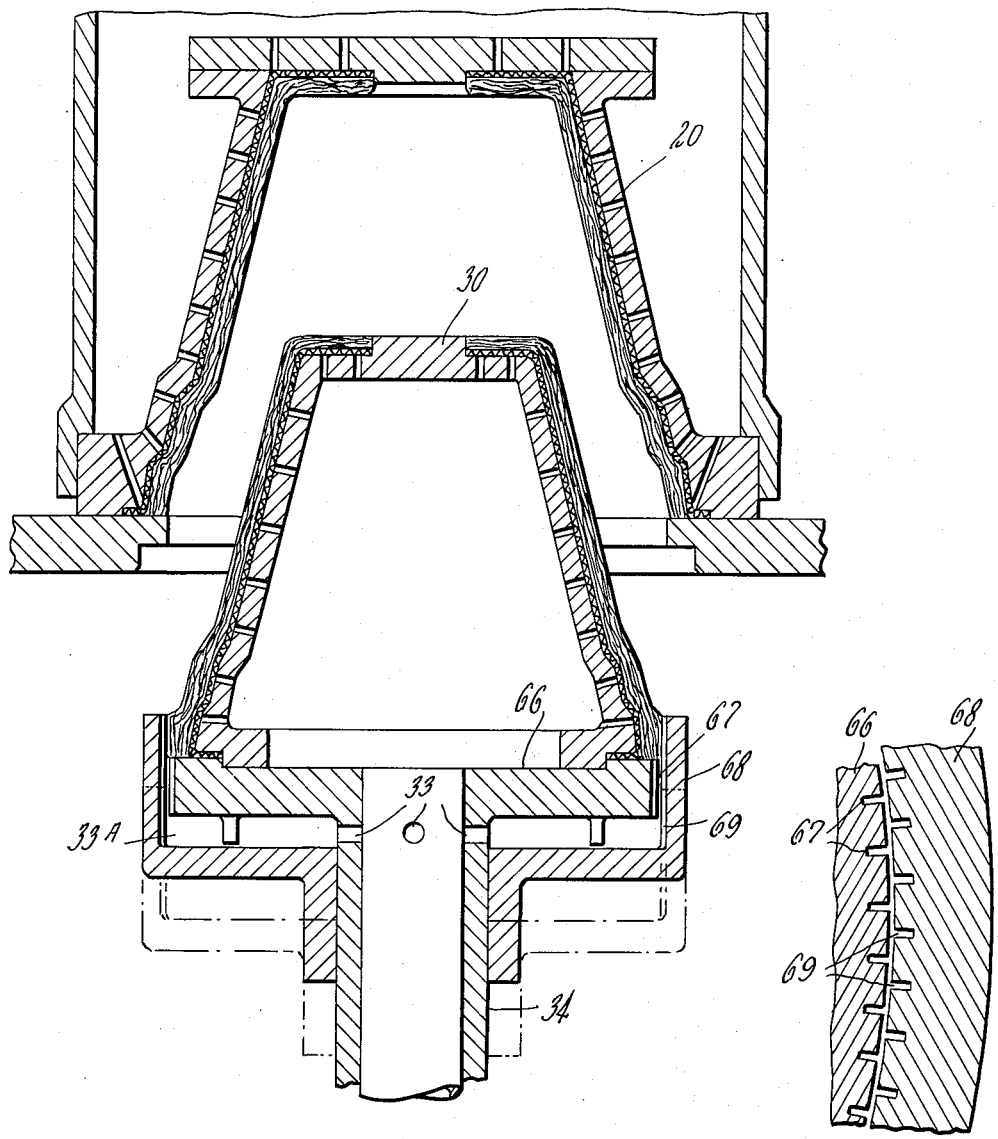

Jan. 9, 1962     C. J. CHAPLIN     3,016,090
PULP MOLDING MACHINE
Filed June 3, 1957     17 Sheets—Sheet 5
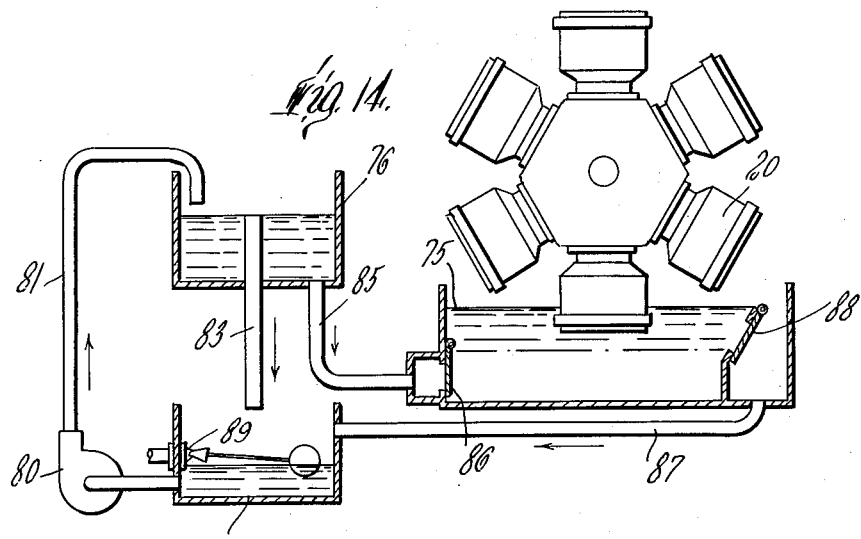
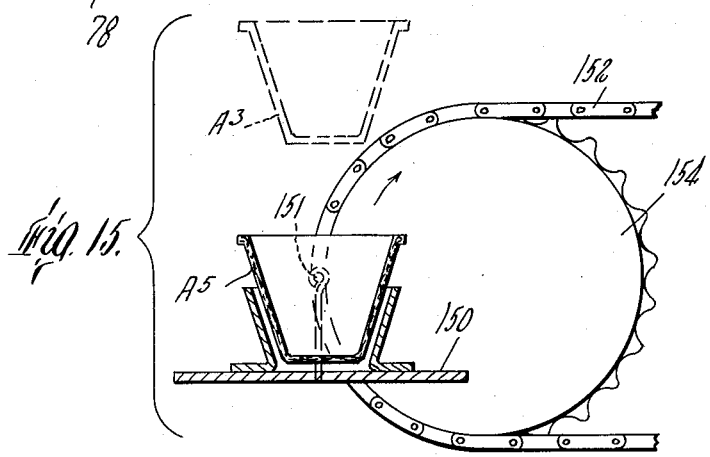
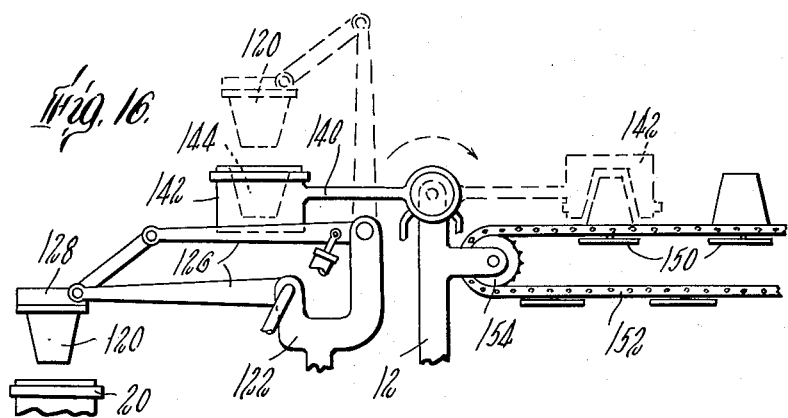

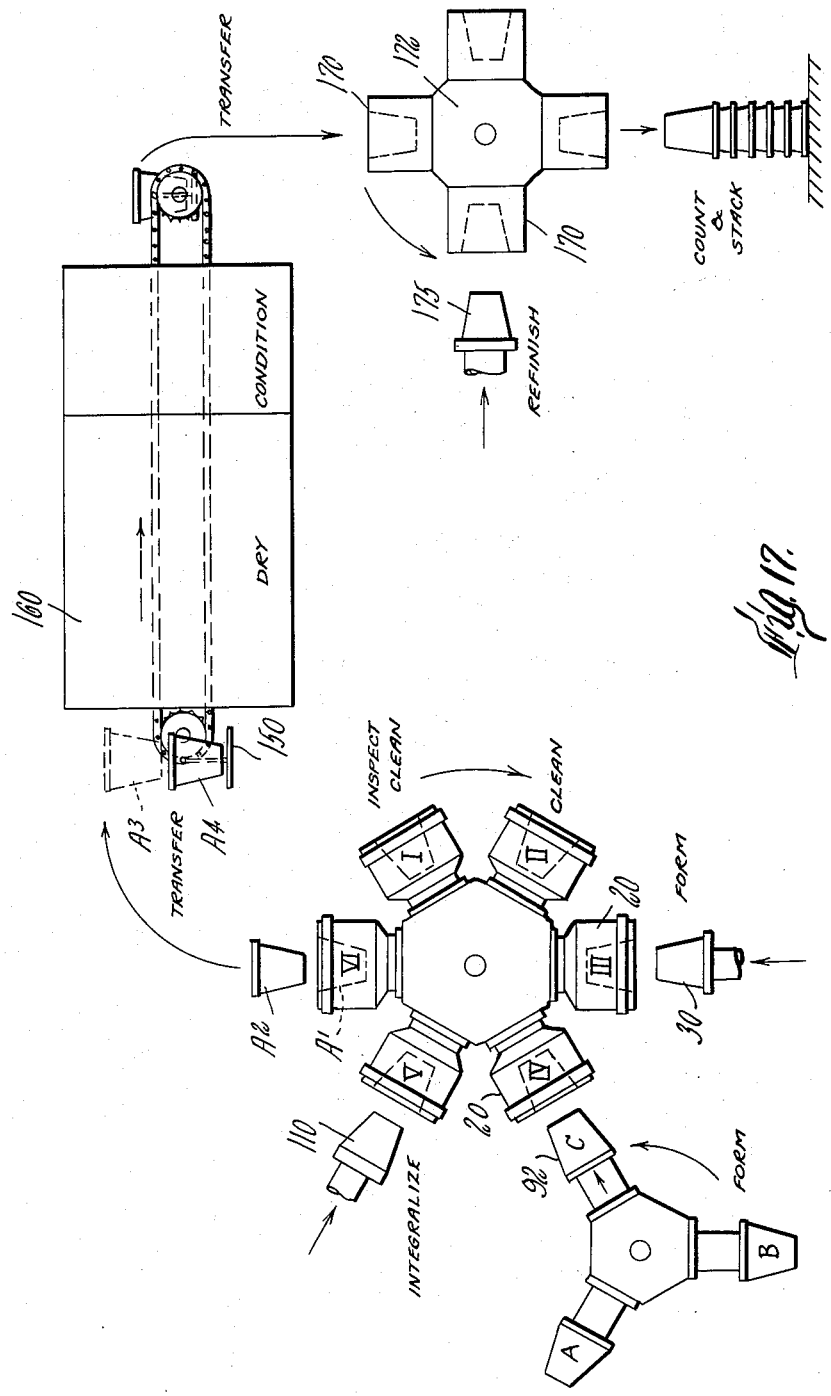

Jan. 9, 1962  C. J. CHAPLIN  3,016,090
PULP MOLDING MACHINE
Filed June 3, 1957  17 Sheets-Sheet 7

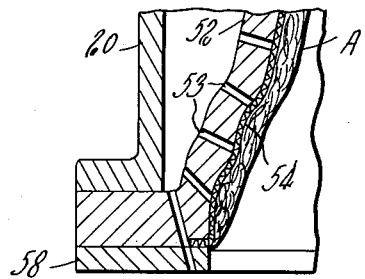
Fig. 35.
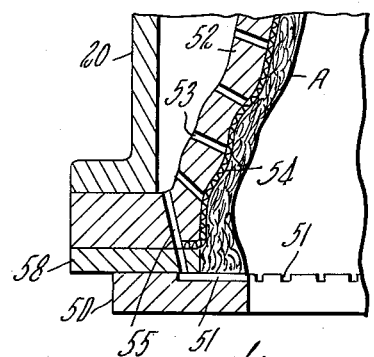
Fig. 36.
Fig. 37.
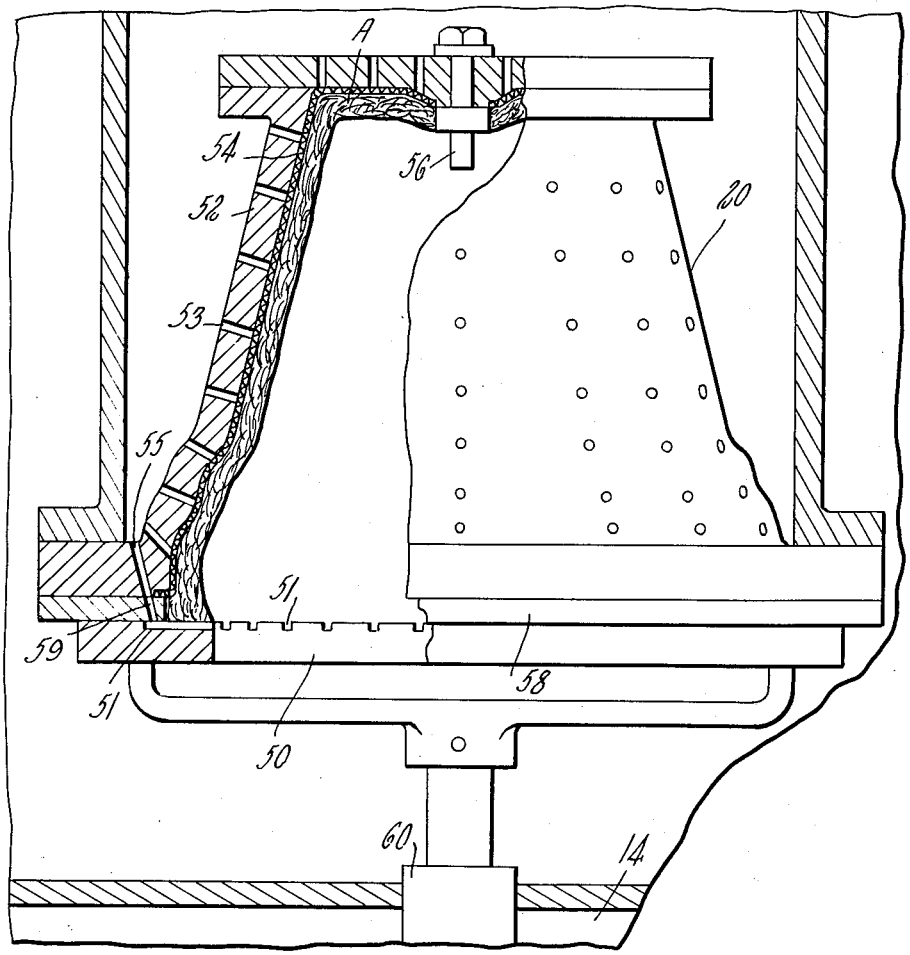

Jan. 9, 1962

C. J. CHAPLIN 3,016,090

PULP MOLDING MACHINE

Filed June 3, 1957

Jan. 9, 1962 C. J. CHAPLIN 3,016,090
PULP MOLDING MACHINE
Filed June 3, 1957 17 Sheets-Sheet 11

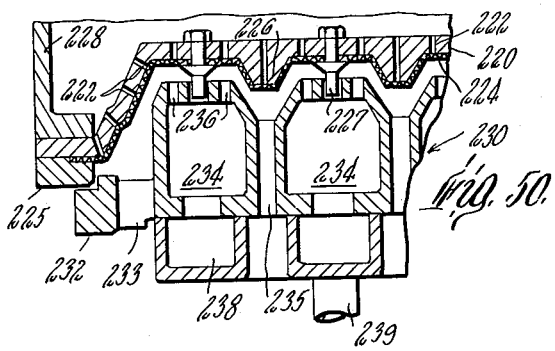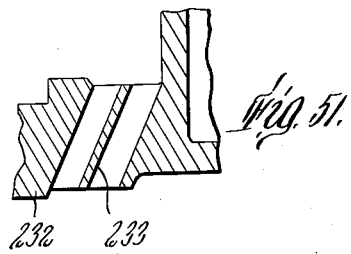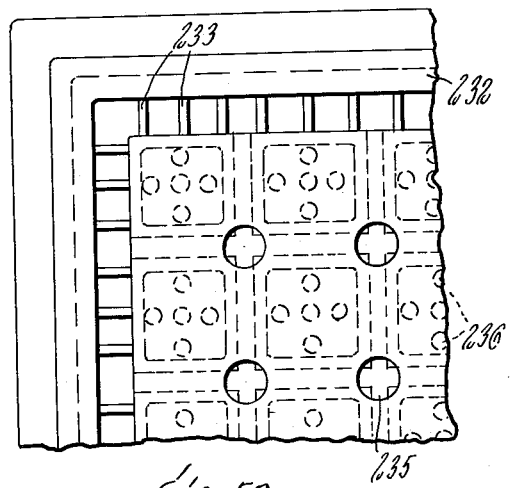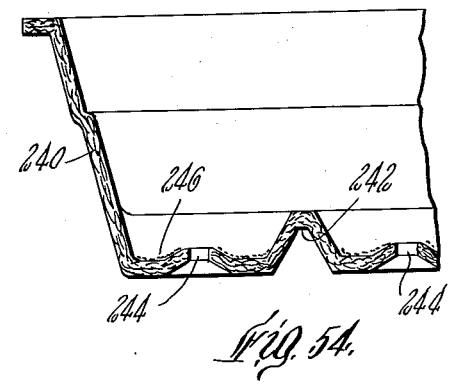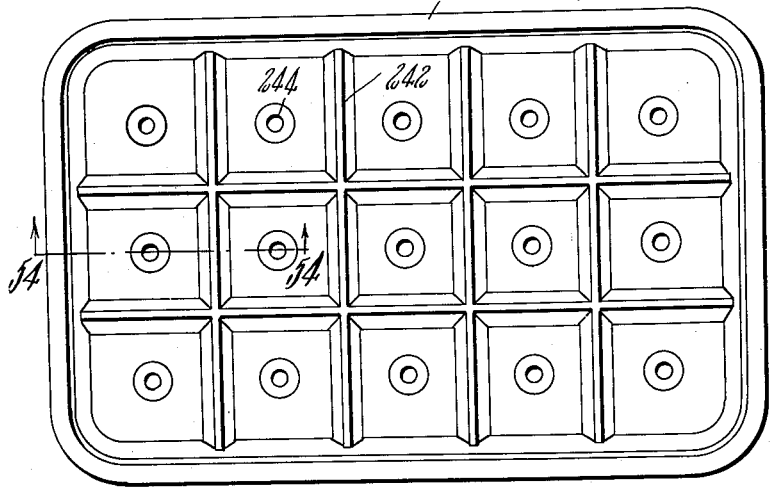

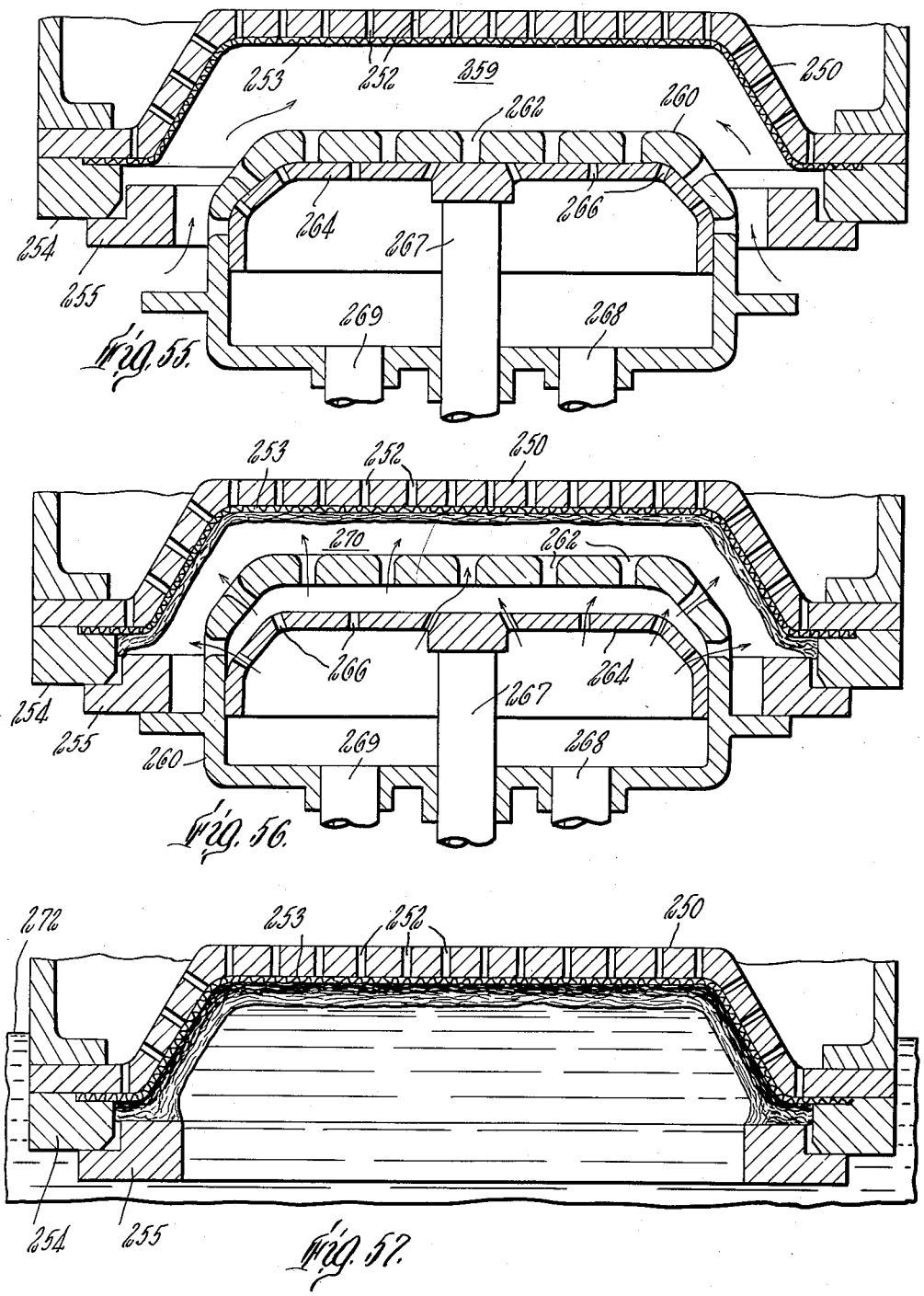

Jan. 9, 1962 C. J. CHAPLIN 3,016,090
PULP MOLDING MACHINE

Filed June 3, 1957 17 Sheets-Sheet 15

Jan. 9, 1962   C. J. CHAPLIN   3,016,090
PULP MOLDING MACHINE

Filed June 3, 1957                             17 Sheets-Sheet 17

United States Patent Office 3,016,090
Patented Jan. 9, 1962

3,016,090
PULP MOLDING MACHINE
Charles J. Chaplin, South Portland, Maine, assignor, by mesne assignments, to Diamond National Corporation, New York, N.Y., a corporation of Delaware
Filed June 3, 1957, Ser. No. 663,271
35 Claims. (Cl. 162—385)

This invention relates to apparatus and methods useful in the manufacture of molded fibrous articles of different kinds and for various uses. More particularly, it relates to molding apparatus and methods capable of producing articles from various materials and of various types, by utilizing a part or all of the apparatus and/or methods, as required, or by a simple adjustment or arrangement of certain parts of the apparatus.

In contradistinction to the usual fibre molding apparatus adapted to produce only one kind of an article by a certain specific method or operation without some basic and extensive modifications, the apparatus of the present invention is capable of quickly and easily providing wide variations in operations, methods and products, making it much more adaptable for production of molded articles and products which, under the modern rapidly expanding and diversified economy, require many types of products of improved and constantly changing characteristics. The principal objectives which the apparatus and methods of the present invention are designed to accomplish are generally as follows:

One objective of this invention is to provide an apparatus for producing ordinary molded fibrous articles which do not require special characteristics or structure, or which must be designed for certain specific uses. In other words, the apparatus of the invention is capable of carrying out the ordinary fibrous molding operations presently employed where such operations produce a satisfactory article or product.

Another objective of this invention is to provide a mechanism whereby the edge structure of molded articles can be improved and reinforced, being particularly useful for those articles on which there is no extending or projecting flange.

Another objective of this invention is to provide methods whereby the characteristics of the fibres or materials being deposited on the forming die can be changed, modified and/or regulated during formation, particularly as to those materials at or near the article surface.

Another objective of this invention is to provide apparatus whereby commonly known "slow" fibrous stocks can be rapidly formed or extra heavy or thick articles produced by utilizing two forming dies operating in the same pulp tank or mixture, the deposit on one die being united with the deposit on the other die while suction formation is still continuing.

Another objective of this invention is to provide apparatus whereby pulp fibrous material even slower than that mentioned in the foregoing objective can be utilized by combining suction and pressure forming methods utilizing two cooperating dies drawing pulp fibrous mixtures from the same tank or chest.

Another objective of this invention is to provide apparatus and methods whereby the normal tendency of the fibrous deposit on articles of deep sections to become uneven due to the thickening or change in density of the fibres being deposited is largely or entirely eliminated; in other words, apparatus for maintaining a controlled liquid fibre density or consistency over the entire forming die surface as it is being formed or molded, regardless of kinds of materials employed, or the size or depth of the article being produced.

Another objective of this invention is to provide apparatus whereby certain pulp stocks can be rapidly and efficiently molded with suction deposit in one direction only, said deposit being accelerated and article densified by a non-foraminous die operating in the liquid fibre tank during the latter stages of fibre deposit.

Another objective of this invention is to provide one or more auxiliary forming or molding stations whereby molded sections can be independently formed of different materials and integralized with one or more sections formed on the initial forming or molding die.

Another objective of this invention is to provide means whereby the various fibre deposits or sections can be integralized by apparatus operating over the entire molded article surface and at right angles to the fibre deposit, thereby effecting a liquid flow through the deposit and effecting a closer fibre bond.

Another objective of this invention is to provide apparatus and methods whereby molded articles having straight side walls without taper or draft either on the inside or outside can be efficiently produced.

Another objective of this invention is to provide apparatus whereby openings or perforations can be provided in the wall or walls of molded fibrous articles without the necessity of changing or modifying the forming die structure on which the article is molded.

Another objective of this invention is to provide apparatus whereby a pattern or embossed decoration or figure may be provided on the article surface, this being performed simultaneously with the integralization of the fibre deposit on the forming die.

Another objective of this invention is the provision of apparatus for delivering the article to the drying or other mechanism with the desired side up, either by delivering it directly from the transfer die, or providing a turnover die with the necessary operating mechanism. This also permits the use of edge reforming or reinforcing mechanism (well known in the art) to reinforce the edge structure of articles as they are coacted upon between the transfer and turnover dies.

Another objective is to provide means for refinishing one or both surfaces of an article which has had its surfaces prepared and conditioned by special forming, drying and/or conditioning methods.

Other desirable objectives and features will be more thoroughly covered and described in the following detailed discussion of preferred embodiments of the apparatus, its various functions and methods of operation, and the products which it is capable of producing, together with the accompanying drawings.

FIGS. 2-5 are detail sectional views showing the steps in the operation of two forming dies and a single tank, cooperating to form accreted pulp sections and to transfer one of said sections onto the other to produce an integral article;

FIG. 6 is a view similar to that of FIG. 3 showing the use of a non-foraminous die cooperating with a single forming die for densifying the deposit on said die before the forming die is removed from the liquid fibre mixture;

FIG. 12 is an enlarged cross-sectional view of the forming dies of FIGS. 2–5 together with edge forming means therefor;

FIG. 13 is a cross-sectional view considerably enlarged on line 13—13 of FIG. 12;

FIG. 14 is a diagrammatic view showing a modification of FIG. 1 wherein the level of the liquid relative to the forming dies is changed by raising or lowering the level of the liquid in the tank, instead of raising and lowering both tank and liquid;

FIG. 15 is a detail view of a portion of the transfer means of FIG. 1;

FIG. 16 is an overall side elevation showing a modification of the apparatus of FIG. 1 having the turnover means of the invention incorporated therein;

FIG. 17 is a diagrammatic view showing some of the various operations and functions performed by the apparatus of this invention;

FIG. 35 is an enlarged view similar to that of the top die of FIGS. 2–5 but showing the type of edge produced in the absence of edge forming means;

FIG. 36 is an enlarged view similar to that of FIG. 35 but showing the type of edge produced by edge forming means somewhat modified from that of FIGS. 2–5 and 12;

FIG. 37 is a cross-sectional view of a single section forming die together with the edge forming means of FIG. 36 therefor;

FIG. 50 shows an arrangement for forming or molding a multiple-plant container, whereby growth and/or other materials can be introduced in controlled amounts into the molded structure in certain selected locations;

FIG. 51 shows a vane arrangement whereby the flow of liquid fibrous materials is directed along the walls more or less parallel to the container edge and bottom rather than in a vertical direction, or directly towards the edge of the article or the bottom of the article;

FIG. 52 is a plan view of the showing of FIG. 50 showing how the flow of fibrous materials is directed along or parallel to the raised sections in the bottom wall of the container, rather than directly vertical towards said walls;

FIG. 53 illustrates a plan view of a plant container produced in accordance with the teachings and functions of the die structure of FIGS. 50, 51 and 52;

FIG. 54 is a sectional view, somewhat enlarged, of a portion of the article of FIG. 53;

FIGS. 55 and 56 show apparatus and methods of distributing various liquids and/or fibrous and/or other materials over the surface of an article during article formation;

FIG. 57 shows the completely formed article produced by the apparatus and methods of FIGS. 55 and 56, after removal of certain of the fibre distributing apparatus;

In order to produce strong durable molded fibre articles, particularly those of substantial thickness, by commonly utilized suction-molding procedures, a considerable amount of time is sometimes required in order to deposit the necessary thickness of fibres on the suction die as it is usually the practice to have less than 1% of fibres in proportion to the water in the liquid-fibre mixture. As the production of superior articles, particularly of widely different kinds and types, therefore requires the removal of large quantities of water during formation, it is necessary that, for efficient operation, the formation time be reduced as much as possible and still build up the necessary fibre thickness and strength. Also, the use of widely different kinds of fibrous materials for the production of many different types and sizes of molded articles requires that the apparatus of this invention be extremely flexible, both from the standpoint of quick and easy changes of the various mechanisms, dies, etc., but also from the changes in the methods by which various types and sizes of articles are produced.

Figure 1:
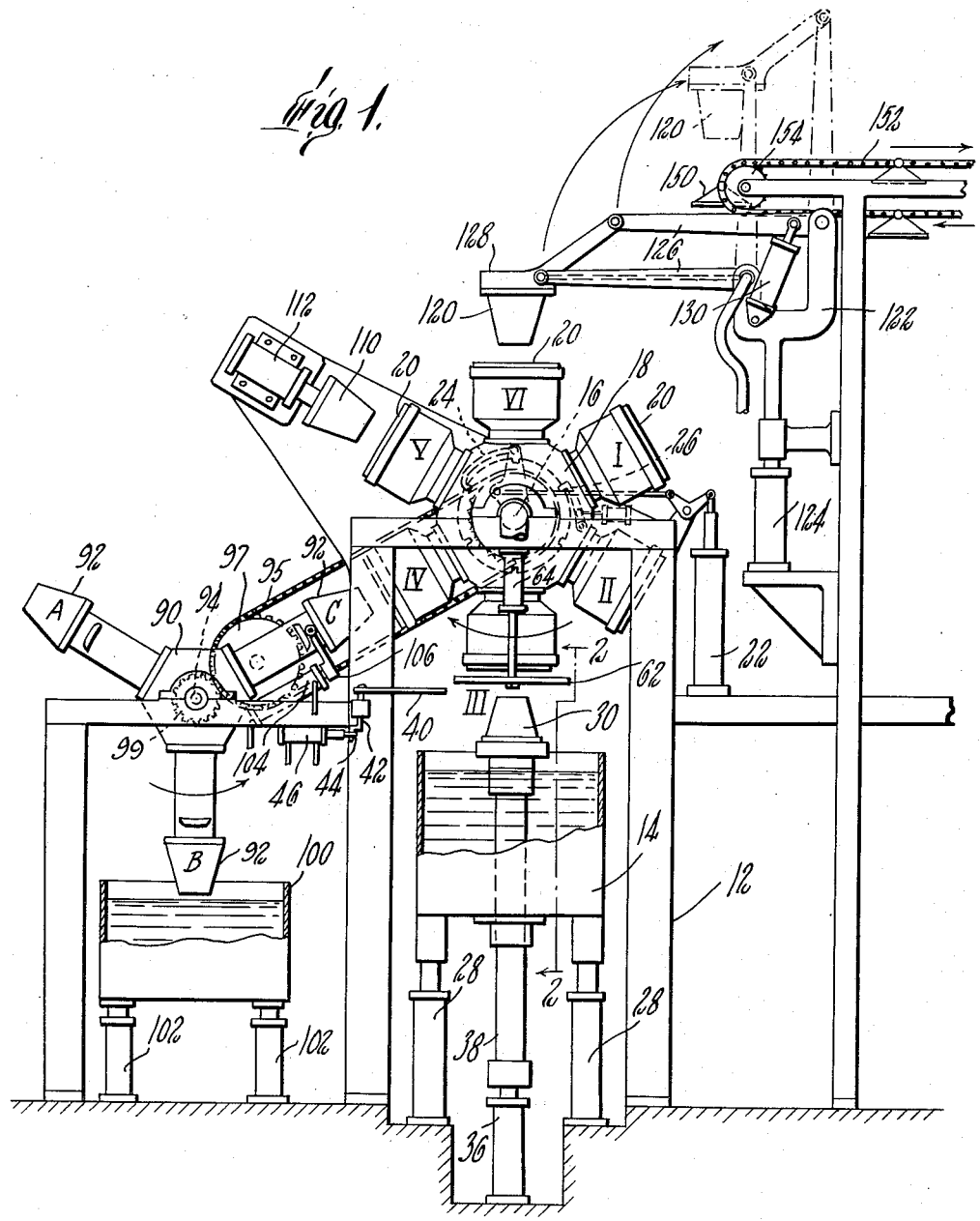
FIG. 1 is an over-all side elevation of the preferred apparatus of my invention.

Referring to the drawings, a preferred embodiment of my novel mechanism, generally shown in FIG. 1, includes a shaft 16 mounted in suitable bearings (not shown), said bearings being mounted on a suitable base frame 12 for rotation about a generally horizontal axis above a tank 14 which may contain a liquid-fibre mixture. Shaft 16 has mounted thereon for rotation therewith a forming drum 18 about the periphery of which are mounted a series of annularly arranged forming dies 20. The forming dies 20 may be constructed in any suitable manner known to the art for the formation of molded pulp articles of various kinds and types, herein being shown as a frusto-conical plant pot for illustrative purposes only.

Although any suitable number or sets of these dies may be employed, according to the present invention, it is preferred that such be an even number, specifically six, arranged around the drum to provide six positions or stations herein designated as I, II, III, IV, V and VI with a main forming station in lowermost horizontal position III and a discharge station in uppermost horizontal position VI, and preferably with an auxiliary forming station adjacent position IV and an integralizing station at position V. Station I may conveniently be used for die cleaning.

Rotation of the drum 18 carrying these dies 20 is by any suitable means such as by hydraulic cylinder 22 to operate pawl 24 which causes them to be passed into tank 14 and locked into position by a hydraulic locking means where a pulp section is accreted on each forming die so submerged at upper forming station III by virtue of suction applied thereto (FIGS. 2–5). Thereafter, the dies 20 are advanced to intermediate stations IV (FIG. 7) and V (FIG. 8) and finally to discharge station VI positioned generally vertically at the top of drum 18.

According to the present invention, means are provided for moving the level of the dilute water-fibre mixture in tank 14 relative to the die 20 positioned at station III to immerse said die to accrete a section of pulp thereon. This may be accomplished by raising and lowering tank 14 by hydraulic cylinders 28 in timed relation to the intermittent advance of forming drum 18 with dies 20 as shown in FIGS. 1 and 2–5, and may also be accomplished by raising and lowering the liquid level itself as shown in FIG. 14 and hereafter more fully explained.

Referring to FIGS. 2–5 and 12–13, in one preferred embodiment of the invention, said tank 14 has mounted therein for vertical reciprocating movement in a straight line independently of the movement of said tank an auxiliary cooperating forming die 30, said die being mounted at the upper end of a piston rod 32 extending through the lower wall of said tank. The reciprocating forming die 30 may be constructed in any suitable manner known to the art to cooperate with upper or rotating forming die 20 positioned at station III so that a section of pulp may be accreted thereon and transferred from such reciprocating die to such reciprocating die onto the section simultaneously formed on the rotating forming die 20. Such dies 20 and 30 and their operation, as well as various modified structures, will be later described in more detail.

The timing of the rotating and reciprocating dies can be adjusted by proper timing of the hydraulic means which moves the reciprocating die into position in conjunction with the hydraulic means that moves the tank containing the fibrous mixture up and down. Commonly the transfer may be arranged to take place after both of said dies have been raised above the level of the water-fibre mixture in tank 14 by the lowering of said tank, and is effected by raising reciprocating die 30 on its piston 32 by means of its cooperating hydraulic cylinder 36, until it is in cooperating relationship with upper die 20, and then transferring its formed section by application of air pressure to die 30 while suction is retained on upper die 20.

In order to prevent damage to the pulp section formed on lower die 30 due to liquid mixture dripping from upper die 20 thereon while the dies are being raised above the level of said mixture by the lowering of tank 14, I prefer to employ a novel deflector means mounted on frame 12 for movement into position between said annularly arranged rotating dies 20 and said tank mounted reciprocating die 30. Such means includes a deflector plate 40 mounted for horizontal swinging movement on frame 12 by means of a suitable shaft 42 having a crank arm 44 thereon. The crank arm is operated by means of a hydraulic cylinder 46 in timed relationship to the movement of upper rotating die 20 and lower reciprocating die 30 to move deflector plate 40 into operative position between the dies prior to the lowering of the liquid pulp mixture below the bottom of die 20 during movement of the tank to raise said dies above the level of said mixture, and for movement out of position during reciprocating movement of the lower die 30 into engagement with upper die 20 to transfer its section of pulp. The deflector plate is moved into operative position prior to the liquid pulp level being depressed below the forming die 20.

As a modification of the above described structure, a non-foraminous die 31 such as is shown in FIG. 6 may be used instead of the foraminous die 30 shown in FIGS. 2 and 3. This non-foraminous die can be used to accelerate the formation of an article on die 20 by imparting a pressure to the fibres being accreted on die 20 by suction. Further acceleration of the deposit on die 20 can also be obtained by using the non-foraminous die in combination with a ring or enclosure structure on die 20 such as is illustrated in FIGS. 43–46 inclusive and more completely described in connection with these figures. Also, as more fully described hereinafter and as shown in FIGS. 1–5, 12–13 and 36–37, edge forming means may be provided at the lower end face of upper die 20 and surrounding the outer peripheral end of lower die 30. With such arrangement, movement of said die 30 will move said ring to and from operative position and so permit such an edge forming ring to be used together with a lower reciprocating forming die.

More specifically, the upper edge forming ring 62 for die 20 is mounted on drum 18 by suitable hydraulic cylinders 64 for movement toward and away from the open end of upper forming die 20, and extends somewhat inwardly thereof to provide the desirable formed edge on the formed article.

As to the bottom die structure, shown enlarged in FIG. 12, the bottom end plate 66 at the closed end of the bottom reciprocating die 30 has an outside diameter slightly less than the inside diameter of forming ring 62 with a recess in ring 62 closely fitting the outside diameter of retractable forming ring 68 on die 30. Said retractable forming ring 68 closely surrounds the outside of end plate 66 and is movable into a forming position flush with the surface of end plate 66 from a transfer position spaced downwardly therefrom so that said end plate will pass into upper forming ring 62 during transfer. The lower forming ring 68 is mounted on a hollow piston rod 34 concentric with and surrounding piston rod 32 and is moved by a suitable hydraulic cylinder 38 cooperating therewith downwardly just prior to transfer as required and with reference to the timed operation of the machine. Preferably, narrow, axially extending grooves 69 are provided on the interior surface of said ring 68, and similar grooves 67 are provided on the cooperating exterior peripheral surface of bottom plate 66. Thus, prior to the die 30 being immersed in the liquid fibre mixture and suction applied, the ring 68 is in the position shown in FIG. 2. When suction is applied through pipe 32, it is also applied to the space between the bottom plate 66 and the ring 68 through openings 33 causing the ring to move upwardly as shown in FIG. 12. The peripheral space between the outside of die 30 and the inside ring 68 can be varied, as may be desirable or necessary, in order to accrete such fibrous materials therein as is desirable or necessary for the finished product. The grooves 67 and 69 aid in accreting fibres more rapidly in this peripheral space by enabling the water of the liquid fibre mixture not only to be drawn through the wire screen and openings in the die 30, but also to be drawn down through the narrow grooves in rings 68 and 66, into the chamber between the ring 68 and member 66 and escaping through openings 33 and pipe 32.

Figure 5:
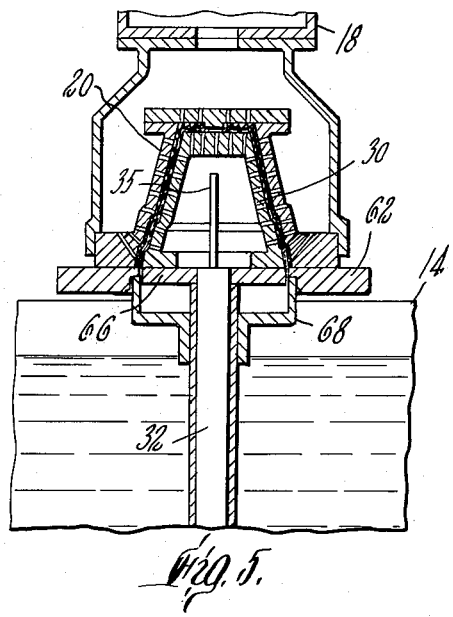

FIG. 5 shows the assembly of the two accreted sections on dies 20 and 30 after they have been assembled with each other. When the ring 68 reaches the die 20, as die 30 is moved upwardly, ring 68 is moved downwardly, at the same time retaining the accreted fibre inside the ring until the die 30 has completely entered the die 20 and the two accreted sections have been firmly affixed to each other. Sufficient accreted fibre has been added by die 30 to the rim or edge of the article to make up for any lack of fibre formed on die 20. After the die 30 has reached the position relative to the die 20 as shown in FIG. 5, vacuum is cut off from pipe 32 and air is applied, thereby aiding in the transfer of the accreted fibre on die 30 away from the wire screen covering on said die, affixing it still more firmly to die 20, at which time the die 30 is moved downwardly leaving the accreted sections on die 20.

Pipe 35 operates to introduce air for transferring the article from die 30 to die 20 to prevent water accumulated in the lower part of either die 30 or tube 32 from being blown back through the accreted article.

In FIG. 3 is shown the tank 14 in its raised position, so that both of the dies are immersed in the mixture to accrete pulp sections thereon, the forming ring 62 being in position against the open end of upper forming die 20 to provide a smooth edge and the auxiliary forming die being retracted within its annular forming recess to similarly provide a smooth edge.

Figure 4:
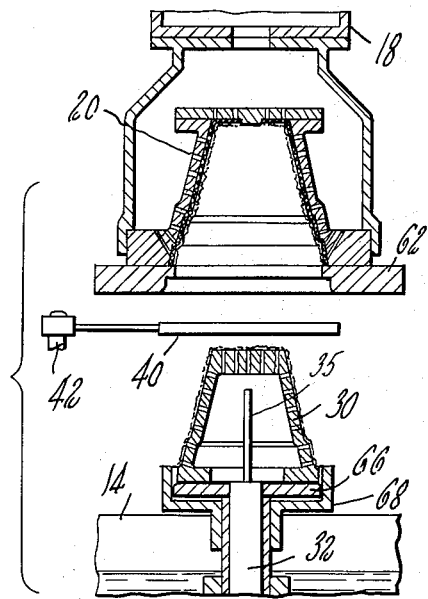

In FIG. 4, after the conventional and well understood application of air and vacuum to the various dies during their functional operation, to complete the formation, the tank 14 has been lowered to bring the upper and auxiliary forming dies above the level of the liquid-fibre mixture. At the same time, deflector plate 40 has been swung in from its inoperative position to protect the pulp section on the auxiliary die from damage due to possible dripping from the upper forming die 20 positioned above it. Immediately thereafter, the deflector plate is moved out of the way and the lower forming die moves upward joining the two sections together between the lower die and the upper die, this being accomplished at an adjustable time or period to effect the most complete junction or integralizing of the two sections into an integral product. Air pressure is then applied to lower die 30 while suction continues to be applied to upper die 20 so that the pulp section on the lower die is transferred onto that on the upper die.

Only such pressure is applied to the sections between the lower and upper dies as may be necessary to firmly attach one section to the other, the sections and the fibres which make up the sections being integralized as described elsewhere.

The apparatus then returns to the position as shown in FIGS. 1 and 2 so that the forming drum 18 can be rotated to its next position.

It should be noted that the article formed as above has wire finished surfaces both inside and outside due to its formation on separate cooperating dies, but that the two sections are partially integrated upon transfer since they are still in a wet or semi-fluid state. For many purposes, particularly in the case of thick-walled articles, the structure so provided is not only formed over twice as fast as it would be with a single die, but has attractively finished surfaces.

As pointed out hereinabove, instead of moving tank 14 bodily to change the liquid level relatively to the forming dies as shown in FIG. 1, the level itself may be changed, by means shown in FIG. 14, and such means may be used with an upper and lower forming die arrangement as well as an upper forming die alone as shown.

With this arrangement, the forming tank 75 has mounted adjacent thereto and at a somewhat higher level a reservoir tank 76 and at a somewhat lower level a storage tank 78, a pump 80 being provided for transferring the liquid-fibre mixture through pipe 81 from storage tank 78 to reservoir tank 76 and an overflow line 83 being provided between said reservoir tank and said storage tank for maintaining a desired operating level in said reservoir tank. Reservoir tank 76 is also directly connected to forming tank 75 by a large diameter pipe 85 having a reservoir tank supply valve 86 therein, and forming tank 75 is similarly directly connected to storage tank 78 by pipe 87 with its level control valve 88. Preferably, both supply and level control valves are located in the tank as shown, but may be located elsewhere under certain conditions and arrangements of the storage and reservoir tanks where such arrangement is preferable.

It will be observed that the amount of pulp stock which it is necessary to move comprises only the difference between the two levels. This is considerably less than half of the total pulp stock contained in the forming tank 75 and not only is the weight of pulp stock to be moved greatly reduced, but it is unnecessary to move any part of the tank itself.

In operation, when the valve 88 is closed and 86 open, stock flows from the reservoir tank 76 into the tank 75 until it overflows at the upper level as shown in dotted lines. However, when valve 88 is open and 86 is shut, the level of the fibre mixture drops to the lower level as shown, overflowing back through pipe 87 into storage tank 78 from which it is returned to reservoir tank 76 by means of pump 80 and pipe 81. Pipe 83 serves to maintain the reservoir tank 76 at any predetermined level and the circulation of stock by pump 80 keeps the fibre mixture thoroughly agitated and prevents settling out or separation. Circulating pump 80 not only provides for furnishing the stock for effecting a rapid change of level, but also provides for the circulation or agitation of the pulp stock which is a necessary feature regardless of any method used to change the stock level. The fibre liquid materials can be furnished to the tank 78 by means of a float valve or any other suitable means 89 and pipe connected thereto. The amount of mechanical work required to operate the valves is small compared to the amount of work which would be necessary to move the entire forming tank structure and the stock therein vertically, to accomplish the desired result.

Figure 7:
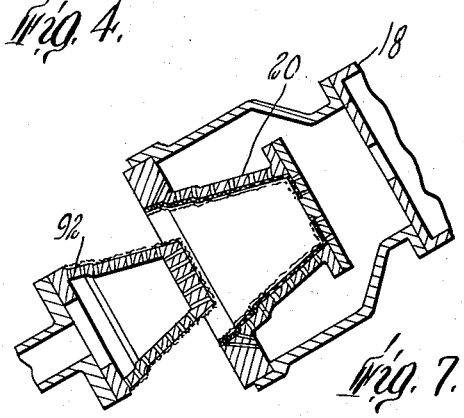
FIG. 7 is a detail view showing the operation of the forming dies to assemble as an integral, multiple-sectioned article with sections accreted from pulp in separate tanks.

Referring again to FIG. 1 and also to FIG. 7, in order to apply a fibrous section of a different constitution to the integrated pulp sections carried in the upper or rotating forming die 20 at position IV, there may be provided a supplemental forming drum 90 having mounted thereon a plurality of supplemental forming dies 92, herein shown as three, positioned at stations A, B, and C, said forming dies being mounted for radial movement with respect to said drum and normally being maintained in retracted position, as shown, by any suitable means.

The drum 90 is mounted for rotation on frame 12 about its shaft 94, and is driven from upper forming drum 18 in timed relation thereto in an opposite direction of rotation and at twice the rotational speed by means of a chain 95 driving a gear 97 which in turn drives a pinion 99 on said shaft 94.

A tank 100 is positioned below said drum 90, preferably with suitable means such as hydraulic cylinder 102 being provided to raise and lower said tank so that a section of fibre may be accreted while the supplemental forming die 92 is in its forming position B. At the same time, an additional accreted section may be formed on the die 30, this die being immersed in the same tank and utilizing the same liquid fibre mixture as the die 20.

With the article now retained by the upper die 20, this die is advanced from its forming position III to a position at IV where it may receive a formed deposit from one of the dies 92 on supplemental die forming drum 90. As shown in FIG. 7, said section on die 92 at its station C having been deposited thereon at its forming station B, by the raising of tank 100 to immerse die 92 in the mixture therein and the subsequent lowering thereof and its subsequent advance to transfer station C, the actual air and vacuum transfer is effected by moving die 92 along a radius of drum 90 coincident with the radius of drum 18 on which the upper forming die 20 is positioned at its station IV, and the subsequent application of pressure to die 92 during maintenance of suction on die 20 to transfer said section.

To transfer the formed section from supplemental die 92 to the section or sections of accreted pulp on die 52, means are provided mounted on frame 12 adjacent station C for moving said forming die 92 outwardly into cooperating relationship with an upper forming die 52, such means including a hydraulic cylinder 104 having an arm 106 engaging the rear face of a die 92 to move it in a straight line radially of forming wheel 90. With the dies thus in cooperating relationship, the transfer of the pulp section on die 92 may take place onto forming die 20 by suitable pneumatic transfer means necessary to effect the transfer of accreted sections from one die to the other, such being well known in the art and hence not specifically described or illustrated herein.

Figure 8:
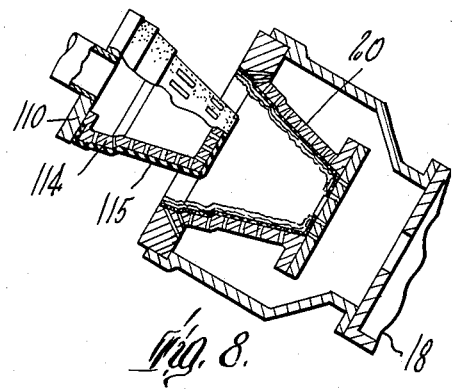
FIG. 8 is a detail view showing the operation of the mechanism for integralizing the article after the forming die has been removed from the liquid fibre mixture either as a single-section formed article on a single die, or as a multi-section article formed on two or more dies and from two or more separate fibre mixtures.

Thereafter the drum 18 again advances to position the article containing die at station V where it is integralized by mechanism as shown in FIG. 8. Such die and its operation will hereafter be described in more detail, but, in brief, a structure having a perforated inner shell 114 and a flexible covering 115 is brought closely adjacent to the fibrous deposit on die 20, this deposit being provided with sufficient liquid to facilitate integralization, the flexible covering is first expanded and at a definite rate and under controlled pressure, and subsequently drawn away from the pulp deposit by suction behind the flexible covering. As shown in FIG. 8, the expansible covering may have a raised pattern formed thereon for embossing the article.

Suitable means are provided for discharging the finished molded and integralized article, and, as shown diagrammatically in FIGS. 1, 15 and 16, may comprise a vertically movable parallelogram arm means supporting a transfer die 120, which die is provided for a vertical movement and a swinging movement, such movements being more fully shown and described in U.S. patent application Serial No. 636,804, filed January 28, 1957, which mechanism will not be here described in detail.

In brief, however, such means includes a reciprocating member 122 mounted for vertical sliding movement on frame 12 and having suitable means for actuating it, such as cylinder 124. At the upper end of said member are mounted a pair of spaced, generally parallel arms 126 supporting the carrier 128 for said transfer die 120. Hydraulic cylinder means 130 is interposed between said member and one of said arms for swinging said arms from their generally horizontal position with transfer die 120 adjacent station VI to their generally vertical position with said die adjacent a conveyor tray 150.

The conveyor itself may be any one of a number of suitable types but preferably is of the tray type as shown in FIGS. 1, 15 and 16, wherein said trays 150 are suspended from chains 152 trained about sprockets 154 for carrying the integrated freshly formed articles through a suitable drying means. Such a conveyor must of course be operated in suitably timed relationship with the movement of transfer die 120, but such being well understood in the art will not be discussed in detail herein.

The several positions of the molded fibre article during operation of the apparatus of the invention are indicated in FIG. 17. A1 is the position in which it was formed on die 20, and A2 the position when removed from die 20 by die 120. A3 is the position with the article still retained on die 120 near the end of its transfer and A4 is the position after the die 120 has moved downward close to the carrier 150 and deposited the article thereon. Immediately thereafter, the die 120 is raised permitting the article to be carried away by the conveyor. Preferably, as shown best in FIG. 15, I deposit the article on the conveyor 150 when the pivot point 151 of a tray 150 carried by chain 152 over sprocket 154 is moving substantially vertically as shown. The die 120 with the article thereon has been previously moved to a position indicated generally at A5, and as soon as the conveyor tray 150 reaches the position shown in this figure, the article is discharged from die 120 which is moved vertically rapidly to a position clear of the travel of loaded tray 150. This enables the placing of the article in or on a die or other supporting or holding device such as is shown in FIG. 15. Immediately thereafter, the parallelogram arms swing the die 120 back to the position over the forming die 20 and the operation is repeated.

If it be desired for any reason to turn over the articles before depositing them on the conveyor, or to re-form the edges of such articles, the above described structure may be modified as shown in FIG. 16 to provide a turnover means interposed between the transfer die parallelogram arm means and the conveyor for receiving articles from the transfer die and turning them over before depositing them on the conveyor.

As shown, a turnover die arm 140 having a die carrier 142 with an internal die 144 is mounted on frame 12 for swinging movement through a vertical arc to move its die 144 from a position as shown directly beneath the transfer die 120 in its transferred position to a position above a tray 150 of the conveyor, suitable pneumatic pressure being applied thereto to effect its transfer formation.

Furthermore, a reforming operation, in addition to a simple turnover, may be performed on an article retained in turnover die 144 by any suitable means known to the art and described, for example, in U.S. patent application Serial Number 382,985, filed September 29, 1953, and in Patents Nos. 2,377,864; 2,408,734; and 2,629,533.

FIG. 17 illustrates schematically the major functions or operations which the apparatus of this invention is designed to accomplish. First, the rotary forming unit can form at station I a simplex, duplex or pressure formed article by the methods and operations above or hereinafter described. It can also have formed at station B a separate article section which can make either a duplex or triplex article at station IV, this having already been described.

The single or simplex section, the duplex or the triplex sections can be integralized by a special device 110 after which the article is transferred to a conveyor tray 150. After passing through a section of the drying apparatus 160 which removes most of the moisture remaining therein to a certain desired and optimum content, the article may be conditioned for either removing the strains which the rapid drying operation may have developed, or for developing suitable surface or other characteristics for subsequent treatment. The article, when removed from the conditioning section, can be delivered, if desired, to a device for refinishing a portion or all of the article, this for the purposes described in greater detail later, after which the article or articles are counted and stacked.

The refinishing operation corresponds generally to the creping, calendering and/or other operations carried on as an adjunct or part of the manufacture of sheet paper materials and is accomplished along similar lines. However, instead of sheet materials, the apparatus of this invention must provide for the handling of individual articles and may be carried out by retaining the article to be refinished in a suitable die 170 on a rotatably mounted structure 172 carrying a plurality of such dies, and pressing, as by a heated die 175, an article carried in a die 170. The refinished articles may thereafter be discharged from said die to form a stack, as shown. Such an operation is useful in connection with many products, particularly those formed whereby a surface material or area is provided with special characteristics so that the surface can be sealed, hardened, densified or otherwise treated, by being compressed by a heated die 175 while the article itself is being retained on the other side by a cold die 170, said cold die being provided with escape passages so that any steam which may be generated due to the application of heat can escape from the article without causing injury to the article itself.

This method is extremely useful in certain products where it is desirable or necessary to have a completely impervious surface, usually on the inside, and includes articles hereinafter described wherein the normal use of these articles permits their ready reuse, thereby effecting substantial, economic savings in growing plants or in packaging, for example.

The refinishing operation can also be utilized to change the shape of the fibre structure at certain points or areas to provide cushioning or other supporting areas for articles or materials to be packed therein. This can be accomplished in a number of ways, but is usually accomplished by a disruption of the then relatively dry fibrous materials by changing their shape or fibrous arrangement, thereby providing an area having different supporting or cushioning characteristics from the integralized strong structure previously described.

Thus, the integrated operation of my novel apparatus is in general as follows: Liquid-fibre mixtures are introduced into one or more of the tanks under constant circulation and agitation so that there will be a uniform dispersion or mixture of fibres and liquid at all times. A rotating suction die 20 of the series annularly arranged on the upper forming drum 18 is caused to be intermittently advanced to position it at a forming station adjacent the upper tank 14 with auxiliary suction die 30 mounted therein to cooperate with the annularly arranged suction die on the upper drum.

With the upper forming drum thus in non-rotating position, the upper forming die 20 is positioned as shown in FIG. 2 vertically above the auxiliary forming die 30 and tank 14, said tank being in its lower position with both of said dies elevated above the surface of the liquid-fibre mixture therein and with edge forming ring 62 in its lowered position clear of upper forming die 20. It will be understood that the omission of the lower forming or smooth plug die still permits the operating of the machine with a single section article, using the edge forming ring if desired, and the means for providing perforations or openings in the article. In this case, the lower forming die is simply removed and a cover placed over the opening in the drainage pipe normally applying vacuum to this die, and the operation of the cylinder moving this die up and down is omitted.

At the discharge station VI, the article is removed from the upper forming die 20 by means of the cooperating transfer die 120 which picks up the article and deposits it either in the turnover die 144 or in a conveyor tray 150 for subsequent processing by drying in chamber 160 and refinishing by dies 170 and 175.

By making full use of the flexibility afforded by apparatus of the type above and hereafter described, a great variety of formations and articles may be provided. Typical examples of such formations are shown in FIGS. 18-26 and 58-60 and of such articles in FIGS. 9-11, 27-34 and 64-65.

Figure 18:
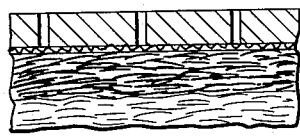
FIGS. 18–26 are illustrative of some of the fibrous structures which can be produced by the apparatus and methods of this invention.

Referring first to each of FIGS. 18-26:

FIG. 18 illustrates the ordinary single section accretion by application of suction through a foraminous die covered with a fine wire screen. In this instance, the initial deposit, or the fibres accreted next to the die or next to the screen covering the die, will be more densely formed due to the higher suction applied to this section of the product than the suction which decreases as the thickness of the deposit increases. Another characteristic of such formation is that the liquid which is drawn through the initially deposited fibre mass in order to deposit fibres farther away from the die, tends to wash out the fine fibres which can pass through the screen covering the die, thereby tending to leave a coarser formation although a somewhat denser formation next to the die itself. Similarly, fine fibres accumulate in the section of the deposit farther away from the die, and, also, the lesser suction applicable to this section of the product, caused by the friction loss of the liquid flowing through the mass, tends to make this section or part of the formation less dense and sometimes of a very loose structure. Such a formation is not objectionable for some products and, in fact, there are instances where such a type of formation is desirable.

The above type of formation is widely used for articles such as pie plates, fruit containers, and similar dry pack products, or where there is little or no liquid or other material which comes in contact with the molded article surface.

Figure 19:
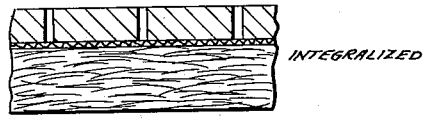

FIG. 19 illustrates the formation of FIG. 18 which has been integralized as previously described. It is important, in order that the deposit may be unformly integralized, that the reorienation of the accreted fibers be substantially at right angles to their surface as any sliding or motion of the integralizing member relative to the accreted surface will disrupt the originally accreted fibre deposit and fail to accomplish a uniform integralizing of the deposit over the entire article area. Such intergralizing of the product adds substantially to its strength and the controlled flow of liquids through the accreted deposit effects a thorough interlacing and interbonding of the fibres in the finished product.

This type of formation, particularly if it is treated with sizing materials, makes it useful for table plates, picnic plates and certain types of packages where an improved surface finish is desirable.

Figure 20:
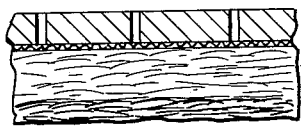

FIG. 20 illustrates the primary and secondary formations or accretions as above described. In this particular instance, the primary formation may be of any desired fibrous material, while the secondary formation applied as described can be of such a character as will give the surface of the entire product the necessary characteristics for the particular use to which the product will be subjected. The secondary formation or accretion being distributed over the entire surface of the first accreted deposit, or in other words, no air or other material being allowed to separate the two accreted sections, means that there is a uniform and strong fibre bond between these two sections of the article, thereby eliminating any tendency for lamination or separating in the finished product.

Figure 31:
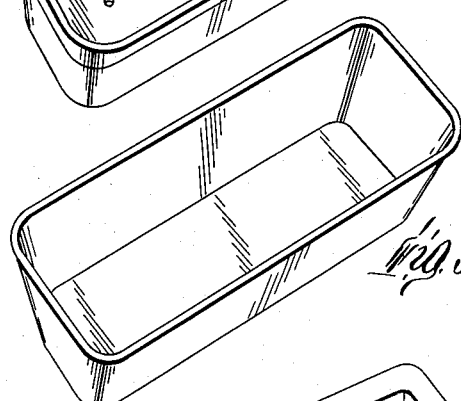

The formation here illustrated enables certain very desirable improvements to be made in certain molded products, in that the secondary layer can be used on the inside of various food containers like that shown in FIG. 31, to retain any juices or liquids which may be packed with the foods in such containers. In this case, a secondary formation would be treated as to be practically impervious to whatever liquids or other materials were to be placed in the container where such a formation was utilized.

Figure 27:
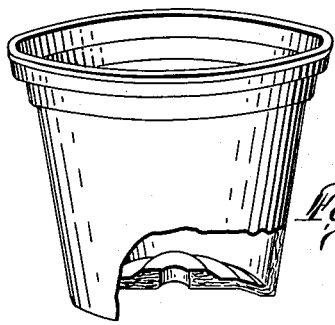
FIGS. 27–34 are illustrative of some of the articles which may be produced by the apparatus and methods of this invention.
Figure 29:
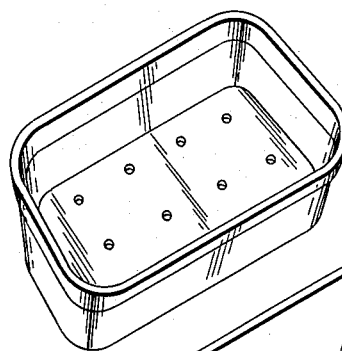
Figure 28:
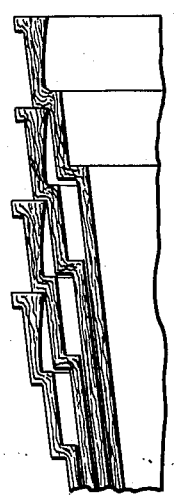

It is also extremely useful for products such as are illustrated in FIGS. 27-29 or articles in which seedlings or plants are grown. Using this type of formation, the primary formation can be made of material which is relatively impervious to the liquids or constituents of the material in which the plants are grown, while the secondary formation can contain various plant foods, such as soluble salts or penicillin, utilizable nitrogen, phosphorus, essential minerals, certain forms of acrylic acid, plant regulator of the carboxylic acid type, organic fibres, peat moss fibres, or hydrolyzed wood fibres with or without urea formaldehyde resins and many other similar materials and products.

When this formation is utilized in the manufacture of such plant growth containers, the secondary formation on the inside of these containers furnishes food for accelerating plant growth, while the primary formation retains the root growth within the container itself until it is removed from the container for final planting.

Figure 10:
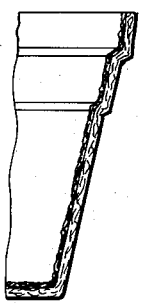
Figure 11:
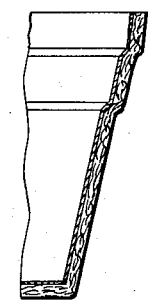
Figure 21:
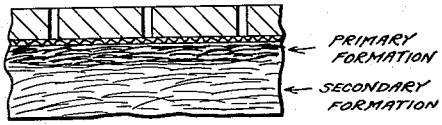

FIG. 21 illustrates the reversal of the process illustrated in FIG. 19 which was described in some detail in connection with the description of the operation of the apparatus to produce the article of FIGS. 10, 11 and 12.

As before mentioned, this reversal of the primary and secondary formations is useful for a considerable number of products, among these being certain food containers illustrated in FIG. 31. In the packaging of certain foods where the juices or liquids which escape from these foods during packaging are objectionable, it is desirable to have the internal structure of the article somewhat absorbent so that these liquids or juices will be retained within the inner wall structure of the article or container and largely kept out of contact with the food in this container and also will not appear to the user when the food product is removed from the container. In this instance, the primary formation can be so treated that the liquids will not penetrate this formation, while the secondary formation absorbs such liquids as may escape from the food product packed in the container. The ratio of primary and secondary formation can be adjusted to meet different conditions and different quantities or amounts of liquid, thereby affording a packaging material for a wide variety of foods where an absorbent internal structure is desirable.

Figure 22:
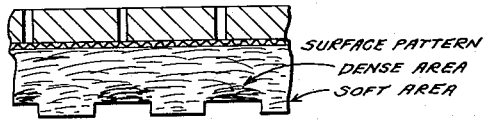

FIG. 22 shows the method by which any of the foregoing deposits can be provided with a surface pattern by having a configuration, pattern or design on the integralizing mechanism 110, previously described. Not only is it possible to provide a pattern or decoration on the surface of the product being produced, but also if carried to a certain amount of depth there is developed a variation in the density or hardness of the various sections of the surface of the article, which effect is desirable for the use to which some products will be put. It can be utilized not only for a surface pattern, but also for certain structural uses as mentioned above, where surface areas of different density and hardness are desirable.

Figure 23:
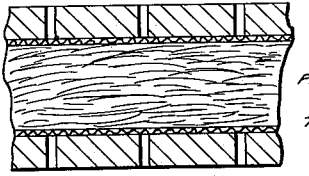

FIG. 23 illustrates the so-called "pressure formed" product whereby fibrous materials which resist the flow of liquid through an accreted mass make there deposit or accretion under ordinary suction methods slow and expensive. In this instance, substantial pressure is applied in a closed chamber to a liquid fibre mass, the liquid from this mass escaping through two die surfaces as shown. This provides a more dense and rigid structure from all kinds of materials, and particularly those whose deposit is slow, than is possible by any of the foregoing described methods.

Figure 33:
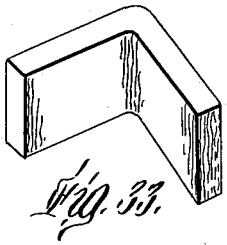
Figure 34:
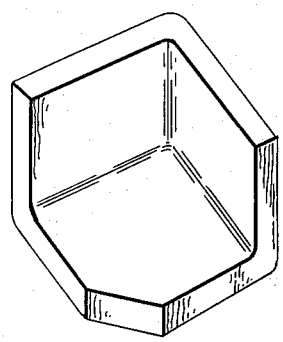

Articles produced by this method can be used for a number of purposes, but one general use is for structural materials, packaging nodules or elements such as illustrated in FIGS. 33 and 34, and many other uses. It can also be utilized to produce any of the structures where strength, rigidity, stiffness and structural stability are necessary or desirable.

Figure 24:
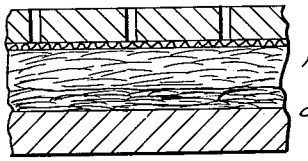

FIG. 24 illustrates a method of pressure-forming certain materials, whereby the flow of liquid expressed from the liquid mass by pressure flows only in one direction, being forced out by an impervious die on the opposite side or surface. This provides an accreted article having some of the characteristics described with reference to FIG. 18, so far as relative density through the thickness of the mass is concerned, but having a more completely unified deposit, and one which will enable fibres relatively slow in molding characteristics to be utilized.

This method of formation is useful where a product not only requires strength and stiffness, but where it is desirable to have one of the surfaces free from wire marks, and where it may be desirable to have a different density between the surface from which the liquid of the formation escapes and the surface against the smooth or pressure die.

Figure 25:
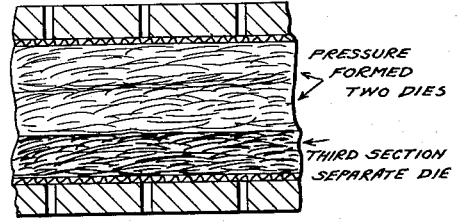

FIG. 25 illustrates the pressure-formed deposits or accretions described in connection with FIGS. 43–46, having a third section formed on a separate die and from a separate mixture affixed or integralized with the pressure-formed sections which were molded or formed between two dies. This method or operation is useful where it is desired to have a strong, rigid, main structure overlying which is a softer or cushion material, particularly useful in products used to pack articles whise surfaces are easily marred and require anything pressing or supporting this surface to be soft and well backed up by a strong, rigid structure.

Articles produced by this method also fall in the packing nodule and structural class, particularly those articles and materials which should have a surface material or covering different from the material which gives it its structural strength, such as nodules, packing corners or angles, such as illustrated in FIGS. 33 and 34, which come in direct contact with finished articles and which are required to hold these articles which are frequently heavy, in a firm, rigid position.

It is also obvious that the section which is added by a separate die and made from a separate liquid-fibre mixture can also be utilized on any one of the other types of products illustrated in FIGS. 27 to 34 inclusive, where a different type of stock is desirable or necessary, and where it is desirable to have this section formed on a separate die and from a separate fibre material.

Figure 26:
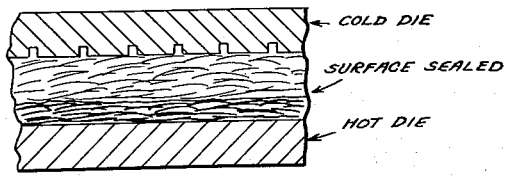

FIG. 26 shows the formation provided by the refinishing step following drying and conditioning.

In FIGS. 9–11 and 27–34 and 64–65, there are illustrated a few of the many types and kinds of articles which can be produced by the apparatus and methods of this invention employing the various structural formations illustrated in FIGS. 18–26. These figures illustrate both old and new articles, the old articles generally being an upgrading of the quality and usefulness of articles and products now in use, and new articles which heretofore it has not been possible to produce in quantity by automatic and efficient equipment.

Figure 9:
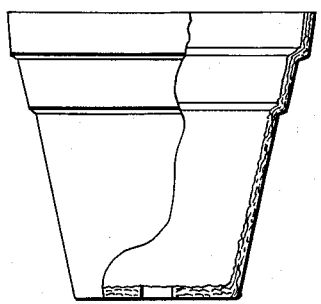
FIGS. 9-11 show an article in the successive steps of formation, such as by the method and apparatus of FIGS. 1–5 and 7.

FIGS. 9, 10 and 11 illustrate a conventional plant pot or container and show the methods by which the structural shape and surface conditions are obtained.

FIGS. 27 and 28 also show a plant pot container, FIG. 27 the general shape and bottom structure, and FIG. 28 an enlarged view of the reinforced article supporting edge. Such articles may employ any one of the several formations illustrated in FIGS. 18 to 26, inclusive, but preferably employ the formations of FIGS. 20, 21, 23, 25, or 26.

The article illustrated in FIGS. 29, 53 and 54 is utilized for the growing of a number of plants, shrubs, etc., and as has been pointed out in the description, it is possible to build up these structures with different types of materials for strength, plant growth acceleration, etc.

In the manufacture of multi-plant containers as compared to an article for a single plant or shrub, it is customary to utilize a rectangularly shaped container containing a plurality of plants which are subsequently removed, individually, and transplanted. In such a container it is desirable that the roots of each plant do not intermingle with the roots of adjacent plants, so that when each plant is removed for transplanting, its root structure will be disturbed as little as possible. It is also desirable under certain conditions, to add plant growth material to the container in such a manner that the roots can absorb most or all of this growth material without penetrating or injuring the container walls.

In FIGS. 53 and 54, respectively, is shown a plan and a cross-section of the article, somewhat enlarged, and there is indicated around the edge and outer walls of the container, the strong fibrous material usually employed for the primary deposit or formation. However, in each of the depressions in which a plant or seedling will be located, there is indicated at 246, a growth material which may be deposited immediately after the initial surface deposit of the fibrous materials has been suction-formed, and this secondary deposit of growth material can be built up to any desired degree in thickness directly under each plant or in the bottom of each of the several pockets.

As it is usually desirable to have perforations or openings in the bottom of a container for this purpose, directly under each of the individual plants or seedlings, a pin 227 is secured to the die 220 by any suitable means, and also, the pin serves to clamp the central portions of the wire covering 224 in place, providing thereby a slightly raised section in the inside of the container, thereby retaining any water or other liquid in the bottom of each individual plant pocket, but limiting the depth of such liquid to the amount by which the opening is raised over the bottom area.

There is a very definite advantage to this method and the article produced by it, in that the roots of each of the several seedlings or plants tend to concentrate themselves in each of the several pockets due to the nutriment of growth material in each pocket, and not spread across the rib structure of the article which separates the pockets. The rib structure in the bottom of the container also makes it easier to remove each plant or seedling without disturbing adjacent plants.

Figure 30:
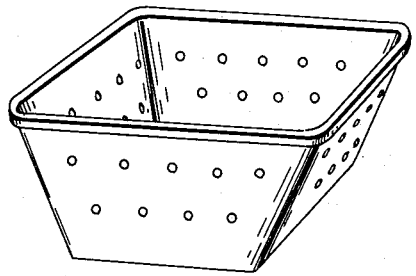

FIG. 30 illustrates the conventional container for berries, in which case it is generally desirable to have a diverse variety of openings depending on whether the berries are large or small and also depending on how much it is desired to display them by making them observable through the wall openings. In most cases, it is desirable to have the openings in the side walls only, but by the methods hereinafter described, openings of any size, shape and number can be provided as desired.

FIG. 31 shows the conventional container for distribution of foods in self-service stores. In this case, it is ordinarily not desirable to have openings, but the surface conditions of this container are important and may vary, depending on the type of product or food to be packaged therein.

Various types of structural formations can be utilized for articles of this type, but generally speaking, those most useful are the ones illustrated in FIGS. 20, 21 and 26.

Figure 32:
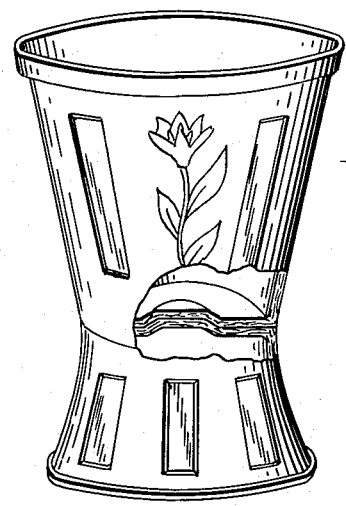

FIG. 32 illustrates the conventional type of jardiniere for display of flowers in the home, hospitals, churches or elsewhere, where it is desirable to have a container which does not have to be returned to the florist. This is illustrative of a type of pattern or figure which can be provided on the container by the integralizing apparatus or method already described. In this case, it is frequently desirable to make the container in two pieces which are secured together with an adhesive just prior to use. This saves storage space and provides a container having a wide, stable base.

FIGS. 33 and 34 illustrate packaging materials used normally for packaging furniture, table tops, sheet materials, etc., where it is desired to protect the edges or corners. Usually, this material requires considerable strength, particularly compressive strength. While these articles can be formed in various ways, preferably the fibre structures produced in accordance with FIGS. 23 and 25 are most useful.

Figures 64, 65:
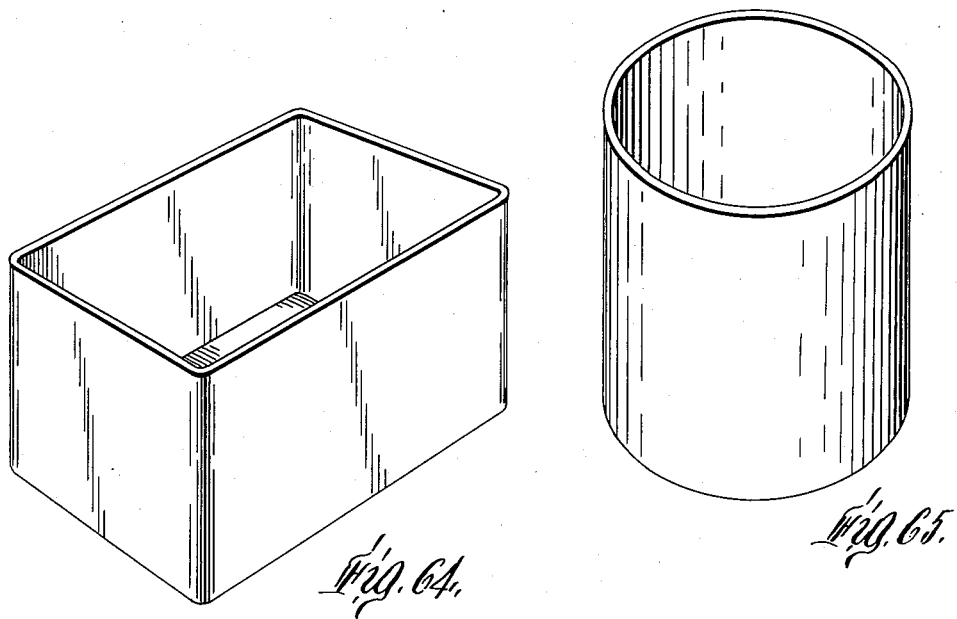
FIGS. 64 and 65 show the types of articles which can be produced by the apparatus of FIGS. 61, 62 and 63.

FIGS. 64 and 65 illustrate articles hereinafter more fully described having vertical or straight sides and the wall structure of such articles can be produced by the integralized suction formation of FIGS. 18 and 9, or by practically any of the other structural formations illustrated in FIGS. 18 to 26, inclusive, with the possible exception of FIG. 22.

In order to produce the various formations and articles above described, the apparatus generally shown in FIG. 1 may be simplified by omitting certain of its functions or may be modified to change certain of said functions as required by the particular operations and sequence thereof desired. The flexibility of operation that makes this possible is a most important feature of applicant's invention. It is therefore apparent that not only can a wide variety and shapes and kinds of articles be produced from widely varying fibre materials, but also the combination or arrangement of dies can be varied to meet various mechanical or machine arrangements or designs which may be desirable or necessary to carry out operations on various types and kinds of products.

Thus, for example, if it be desired to carry out conventional single section molding without any elaboration whatsoever, such may be readily accomplished by utilizing only the rotating forming dies 20, without the auxiliary die 30, the supplemental forming dies 92 or the integralizing mechanism 110, and even the edge forming ring 62 on die 20 may be omitted if desired, although an unattractive rim may be frequently left on articles so molded, such as is shown, for example, in FIG 35.

However, according to the present invention and as described above, the use of a cover or edge forming ring, whether of the type adjacent the end face of the article or of the type around the periphery of the article or both, is an important and useful feature and one readily provided, whether for single or multiple section molding, by the apparatus of the invention.

Considering first the use of a cover ring for single section molding, such a ring may, as desired, be operated as described with reference to ring 62 in FIGS. 2-5 and 12 above, or more preferably, to permit the use of a single cover ring successively operative with each of dies 20 at station III and one extending inwardly for a greater distance without interfering with article transfer, by means of a structure similar to that used to support and operate lower reciprocating die 30.

Thus, referring to FIGS. 36 and 37, the cover ring 50 therein shown provides for the accumulation of added fibrous materials at the rim or edge of various types of articles and the use of such a ring hence provides an attractive, smooth and sharply defined edge on the article being formed, and in some instances may eliminate the need for a reforming operation. Such means comprises an edge forming ring 50 mounted in tank 14 and operated by a hydraulic cylinder 60 or other suitable means for reciprocating movement to move said ring into cooperating position with upper die 20 while said die is maintained in position at forming station III and to move said ring out of position to permit rotation of forming drum 18 so that another forming die 20 may be brought into forming position at III. More specifically, the upper or rotating die structure 20 includes an outer frusto-conical foraminous shell 52 provided with drainage openings 53 and having its interior surface covered with a fine wire mesh screen 54. If it is desired to have an opening in the molded product, a post 56 may be provided as shown. The open end of this forming die is provided with an annular ring member 58 which is secured to the die, and clamps between it and the die shell 52 the edge of the screen covering above mentioned. The die shell 52 is secured to its carrier by screws, bolts, or any other suitable means. The outer diameter of ring 50 fits within the bore of said member 58 and projects inwardly therefrom to define the edge of an article formed therein. The inner edge of such ring being positioned relative to the ring 58 at such a point in the depth of ring 58 as will provide whatever thickness or weight of edge structure is desired on the molded article. Added drainage is preferably provided to accrete fibres more rapidly at the edge structure, this being in the form of narrow grooves 51 in ring 50, which grooves drain into openings 59 in member 58 and thence into the vacuum chamber surrounding die shell 20.

Figure 38:
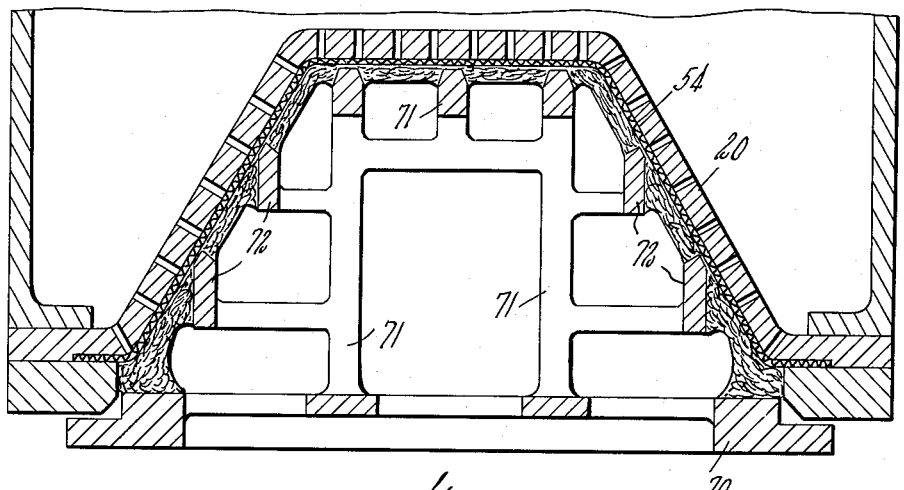
FIG. 38 is an overall view of a die structure with edge forming means generally similar to that of FIG. 37 but further including means for providing openings or perforations in the bottom or side walls of an article while it is being molded.
Figures 39, 40, 41:
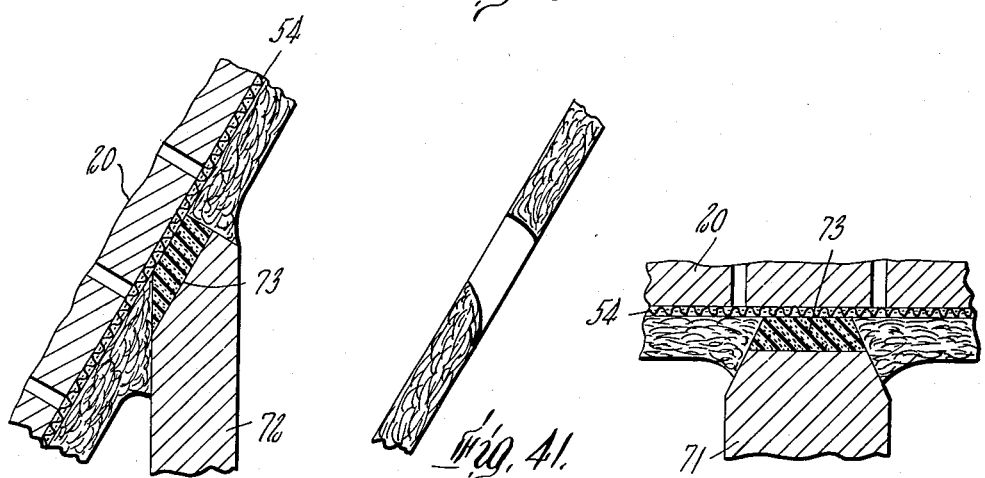
FIGS. 39 and 40 are enlarged views of portions of FIG. 17.
FIGS. 41 and 42 are enlarged views of portions of an article molded by the structure of FIG. 38 after the article has been operated upon by the integralizing die structure of FIG. 8.
Figure 42:
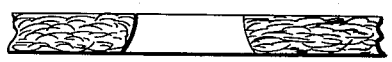

As a modification of the forming ring associated with a forming die as above discussed with reference to FIG. 37, such a ring 70 may comprise a structure with a plurality of posts as shown in FIGS. 38–40 having their ends arranged to be closely spaced from or in contact with the wire 54 so that a molded article having openings or perforations such as shown in FIGS. 29, 30, 41 and 42 may be readily manufactured.

Such ring and post structure provides an internal lattice work or open structure which will not interfere with the fibers flowing to the die surface and the posts or projections may be of any desired figuration, size and number, herein shown as central posts 71 and side posts 72. The ends of these posts come near, or actually contact, the wire surface, and where they contact the wire surface, preferably soft yielding material 73 such as rubber, as shown in FIGS. 39 and 40, is affixed to the end of such posts, particularly where it is desired to seal tightly against the wire and provide a smooth article opening, and also to prevent wear or injury to the die covering itself.

The accretion of fibres on the die is accomplished in the regular manner, and the edge reinforcing ring or cover ring 70 can be provided with grooves accelerating formation as has already previously been mentioned. When a sufficient amount of fibres are accreted on the die, this die is removed from the liquid fibre mixture, either by lowering the fibre containing tank or the level of mixture in this tank, and the entire post and ring structure is moved downwardly by the same mechanism as is normally used to operate the lower forming die 30.

After being acted upon by the integralizing mechanism, the character of the opening in the side wall structure will be similar to that illustrated in FIG. 41, this being initially formed by posts 72 and the rubber or soft tip 73 thereon. Similarly, the opening in the bottom of an article after pressing will be similar to that shown in FIG. 42.

Such structure provides a ready means for producing articles having different perforations or openings therein, without the necessity of having expensive dies with specially affixed perforating attachments mounted or fixed to the forming die surface. Furthermore, the use of such attachments does not provide a smooth, clean opening, and it is a frequent source of trouble and difficulty due to the tendency of the article to stick in the forming die and to prevent or retard its ready removal. Therefore, two decided objectives are accomplished; one, to produce a more uniform and pleasing opening; and, second, to provide a variety of openings by simply having a single structure with the posts arranged in any desired form or pattern.

Additionally, an edge forming ring of the type surrounding the end of the forming die may be used for single section formation, such as is shown, for example, in conjunction with the lower reciprocating die 30 of FIG. 12. Such a ring may as well be used on the rotating die 20 or may be substituted for or used in conjunction with a single ring structure.

As described above with reference to FIGS. 2–5 and 12–13 where two forming dies are utilized, such as is illustrated in FIGS. 2 and 3, a strong edge structure is provided by accumulating such additional fibre deposit as may be necessary on the reciprocating die 30, illustrated somewhat enlarged in FIGS. 12 and 13. In this case, a ring 68 surrounds the support 66 for the die 30, this ring being of such a diameter and projecting a sufficient amount above the die support 66 where it clamps the die covering into place, so there will be accreted by suction between the die surface and the ring, a sufficient amount of fibrous material to make up for any deficiency of fibrous material deposited at or near the edge of the article, the character of said deposit being indicated in FIG. 12. The ring 68 is raised from the dotted line to the full line position shown in FIG. 12 by suction operating through holes 33 and the space between the bottom ring surface and the plate 66. This same suction is utilized to accrete the fibres on the surface of die 30. The edge forming ring 62 for the upper die 20 is moved into and out of engagement with the upper forming die by suitable means such as hydraulic cylinder 64. In other words, it is moved downwardly into the position shown in FIG. 2 to permit advancement of the die 20 from position to position, and is moved upwardly to the position shown in FIG. 3 while formation or accretion by suction is taking place.

Although the structure of FIG. 1 is useful for forming single section articles, particularly when a tank mounted forming ring such as shown in FIG. 37 is needed, its greatest usefulness is in the production of multi-section articles, either two sections or three sections, as above described in some detail with reference to FIGS. 1–7 and 12–13.

This usefulness is enhanced since, as pointed out above, the timing of the rotating and reciprocating dies 20 and 30 can be adjusted by proper timing of the hydraulic means which moves the reciprocating die into position in conjunction with the hydraulic means that moves the tank containing the fibrous mixture up and down. Thus, in some instances it may be desirable to close the dies while both are immersed in the pulp mixture. For the production of other products, it may be desirable to drop the pulp mixture below the level of one or both dies before they are closed. Accordingly, one feature of the machine of this invention is its ability to be so timed and adjusted that these operations adapt the machine for the production of a wide variety of products from widely different materials.

Preferably, however, the assembly of the two sections separately formed at station III, takes place after the level of the water fibre mixture is below both dies. The reciprocating die 30 on its piston 32 is moved by means of the hydraulic cylinder 36, until the section on the die 30 is firmly affixed to the previously formed section on die 20, immediately after which, the article on die 30 is transferred by the application of air pressure on die 30 and suction on die 20 so that both sections are now retained on die 20.

FIGS. 43–46 illustrate a formation method similar to that previously described, in that two cooperating dies are utilized operating to accrete pulp from the fibre mixture in the same tank with the addition that a part of the formation time is by suction, and a part of the article is formed under pressure. In these figures, the upper die 180 and its carrier 181 correspond generally to the die 20 of FIGS. 1–5. Similarly, the die 183 and its carrier 184 correspond generally to the tank 14 and plunger 185 corresponds generally to plunger 34.

The complemental pressure molding dies 180 and 183 can be of any configuration, size and shape, and the one shown in FIGS. 43–46, inclusive, is an article similar to those shown in FIGS. 32 and 33. It is understood, however, that the shape and size of dies are subject to wide variation and that these dies might be designed to produce a wide variety of products, including electrical mounting panels, switch boxes and covers, industrial parts, replacing metals, plastic or other materials, shoe parts, such as box toes, soles, heels, etc., and many other objects which can be produced by this method as a modification of the mechanism of FIG. 1, and by the employment of suitably shaped structures, fibous materials, pressures, and with or without subsequent treatment.

Thus, the die 180 has, depending therefrom, a ring or peripheral enclosing structure 182 corresponding in general shape to the outside edge of the article to be produced. Cooperating die 183 similarly has an outward surface 183A which fits snugly inside of the enclosure 182. Initially the two dies 180 and 183 are in the position shown in FIG. 43 with the pulp stock level indicated generally at 187. The first operation is to raise the stock level indicated in FIG. 44 at 188. At the same time, suction is applied to the rear face of both die 180 and die 183, causing a suction deposit of fibres to accumulate on the faces of these two dies. After a certain period of time, depending on the character of the article which is produced, and the material from which it is made, the lower die 183 is raised to the position indicated generally in FIG. 45, by means already described, the pulp stock level remaining at 188, or the same level as indicated in FIG. 44. The outer portion of die 183 has entered the inner portion of ring or enclosure 182, thereby trapping a certain amount of liquid-fibrous mixture in the area between two dies, indicated generally at 189. Continued upward movement of die 183 brings it into the position indicated generally in FIG. 46, the liquid of the entrapped fibre mixture 189 having been expelled through the previous suction deposits, through the die covering and the die, and the entire mass has become pressure-formed or solidified by pressure between the two dies 180 and 183.

Figure 43:
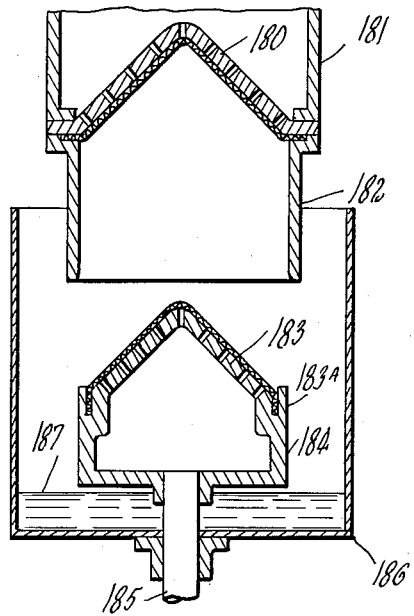
FIGS. 43–46 are detail sectional views similar to FIGS. 2–5 but showing means for forming articles by a combination of suction and pressure molding.
Figure 44:
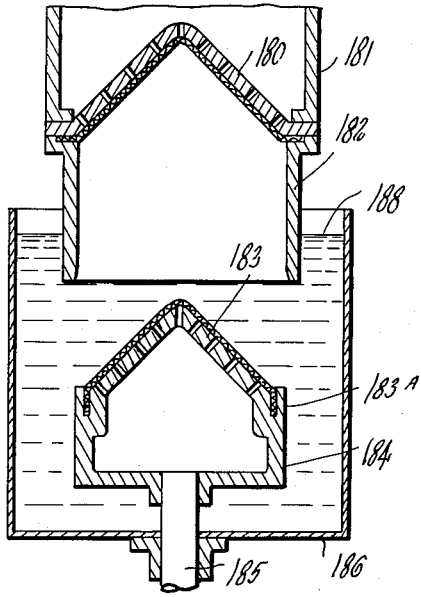
Figure 45:
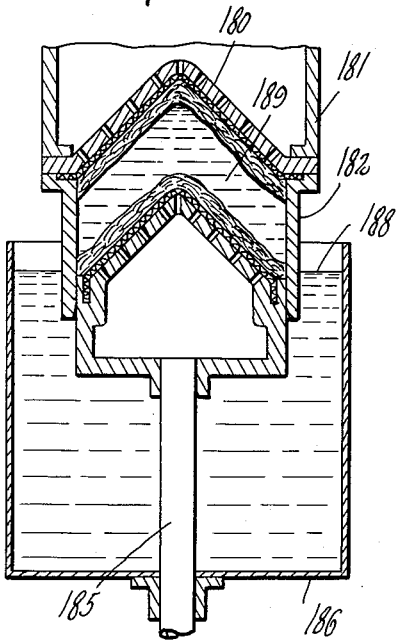
Figure 46:
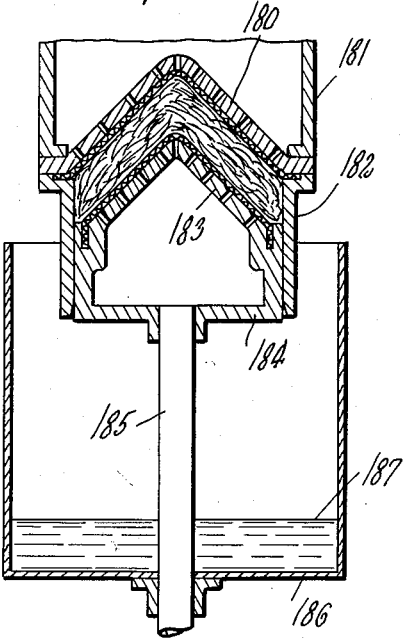

After pressure has been applied for a sufficient length of time to expel most of the liquid from the pressure-formed article, the suction is retained on die 180 and air pressure is applied to the rear face of die 183, and the die 183 is returned to the position indicated in FIG. 43, leaving the pressure formed article on die 180. The subsequent operation of movements of die 180 is much the same as that already described.

The use of the enclosing ring structure as above described, provides a method of determining the amount of fibrous materials which will be pressure-molded into the final product and forms an accurate meter or measuring device very useful in the control of product weight and thickness or size. This is particularly true if the die arrangement is reversed from that shown in FIGS. 43 to 46 by providing the ring structure on the bottom die and simply filling the ring enclosure with the fibrous materials prior to the pressure forming operation by the upper die.

This initial deposit should be sufficiently open in texture so that there will be little diffiuclty in forcing the liquid entrapped in space 189 through the two suction-deposited portions. Similarly, the fibres suction-deposited will not be too firmly affixed to the wire coverings on the two dies, thereby enabling the removal of the article from the wire covering and die without difficulty.

Not only can any type of die or shape of die be utilized by this latter method, but also the relative position of the dies as shown in these four figures can be reversed. By this is meant that the cylinder or the enclosing portion can be on the lower die and the upper die will be generally the die indicated at 183. In this instance, the space in the enclosure 189 will be filled with the pulp mixture by gravity, providing this mixture for the initial suction formation, instead of being drawn up into the enclosure by suction.

If a multi-section article having different compositions of its sections be desired, a supplemental forming tank 100 and wheel mounted dies 92 may be used, as above described, with reference to FIGS. 1 and 7, such being particularly useful for the adding of a lining section of specific composition to a relatively thick-walled article made up of two sections accreted at station III on forming dies 20 and 30 and there assembled, although it may be used for adding to a single section formation if desired.

Alternatively, means may be provided at station III itself, for modifying the formation, for one or more reasons hereinafter appearing.

Thus, accreting certain fibrous materials, particularly where the stocks are "slow," this being a term used in the molding industry to indicate that the water escapes from the fibres rather slowly, there is a decided tendency for the water to be drawn from the fibre mixture in a deep die more rapidly than the fibres contained in this mixture are deposited, thereby resulting in a thickening of the liquid mixture in the deep recesses of the die and resulting in poor formation. The apparatus shown in FIG. 47 is designed to obviate this difficulty and, also, can be utilized where it is desirable to have a different material deposited on the internal surface of the article being accreted.

Figure 47:
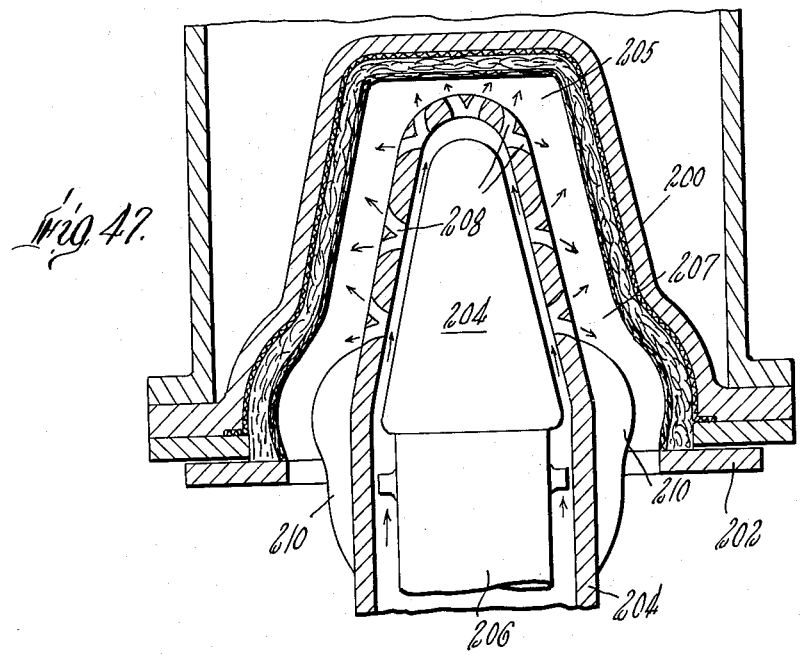
FIG. 47 shows means whereby the character of the deposit in a deep die such as is shown can be modified during formation by utilizing various liquid and/or other materials delivered through a central distributing or injection mechanism.
Figure 48:
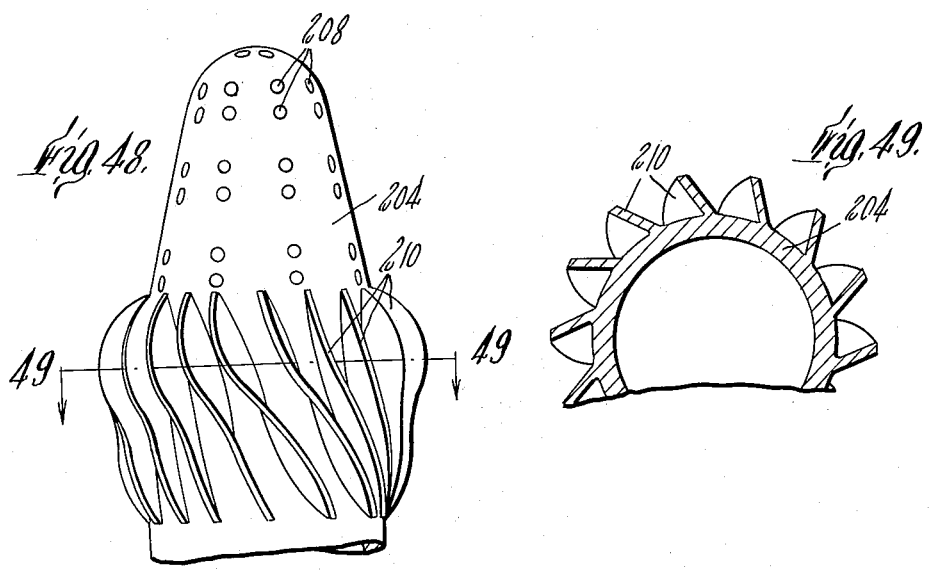
FIGS. 48 and 49, are, respectively, side and cross-sectional views of an element of FIG. 47.
Figure 49:
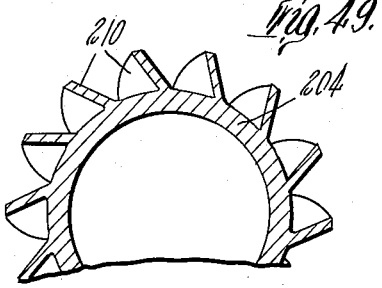

Referring to FIG. 47, an upper forming die 200 can be utilized together with its cover ring 202, similar to that of FIGS. 1–5, but after the die 200 is immersed in the liquid-fibre mixture as has already been described, a perforated hollow member 204, best shown in FIGS. 48 and 49, may be inserted in the cavity of the die 200 by the same mechanism that is normally used to move die 30 or the lower forming die into position. Inside of the hollow distributing member 204 is a plug valve member 206 which, in its upper position, covers the several ports 208 and prevents any liquid introduced under pressure in member 200 from escaping. After a certain amount of fibre has been deposited on the die 200 by suction, liquid of various characteristics may be forced through openings 208 when the valve or plug member 206 is lowered to the position shown in this figure, and this liquid is distributed over the entire internal surface of the die 200 and the fibres contained in said liquid accreted thereon by suction. By a suitable arrangement of the perforations or openings 208 in the hollow member 204, the consistency or ratio of fibres to water at any portion in the interior of die 200 can be regulated and maintained and as a further control, the space between the perforated member 204 and the fibre deposit on die 200 can be changed as desired.

FIGS. 48 and 49 show details of the structure shown in FIG. 47, this having to do principally with the structure of the internal member 204 which may be used to deliver the same or different kind of or more dilute material to the die from that in which the die is immersed. Thus, arranged around the outside of the member 204 are a series of spiral fins 210, the purpose of these being to establish a circular or spinning motion to the fibres around the inside of the die 200 thereby increasing the tendency of the fibres to deposit themselves circumferentially, thereby increasing the strength of the article, particularly at the edge, as well as in stiffness and rigidity.

In operation, the die 200 is immersed in the liquid-fibre mixture in the tank, and suction deposit begins, thereby providing a section of the deposit next to the wire screen from the material in the main tank. As soon as the screen has been covered and the deposit built up to the desired thickness, a secondary material is injected through the openings 208 in the member 204 by withdrawing the plug valve 202, the quantity of material being such that it will all be deposited on the section already built up but only in the deeper section or portion of the product indicated generally at 205, while the deposit at the area generally indicated at 207 will continue to be drawn from the main liquid-fibre tank or mixture in this tank and, as previously described, the spinning motion imparted to the fibres due to the spiral fins 210, will build up a strong circumferentially arranged fibre rim on the article while the secondary deposit is filling up or building up the thickness of the article at such distance below the rim as may be desired.

Particularly where it is desired to have a different material for any purpose, as will be subsequently described in detail, on the internal surface of the article being accreted on die 200 there can be substituted a liquid containing fibres, chemicals, etc., through the hollow distributing member 204 and the openings 208 to deposit any special material or ingredients on the surface of the article being accreted on die 200 during the latter stages of its accretion operation. The amount of liquid or fibre materials deposited can be accurately controlled and regulated by the time the valve member 206 uncovers the openings 208 and, similarly, the size and position of the openings and the taper section of the plug can be adapted to deposit materials in any desired ratio or proportion over any portion of the article surface.

Such an arrangement or method of depositing fibres is particularly useful where it is desired to utilize a plant growth material such as peat or peat moss, but which has very little strength and stiffness if formed into an article without considerable additional reinforcing long fibre materials. Even so, the article is relatively weak, particularly at its top edge and frequently the amount of peat or peat moss growth materials which it is possible to utilize, is considerably less than that which is desirable, or the article must be made very thick and heavy to secure necessary strength.

With the method and apparatus here disclosed, however, it is possible to have a strong fibre outer shell or section over the entire article, and an extra strong fibre rim for the entire thickness of the article at the top edge, but still have peat, peat moss, or other growth material deposited on the inside to any desired thickness or amount.

Relatively deep rectangular articles, illustrated in FIGS. 53 and 54, may be similarly molded as may be seen by referring to FIGS. 50–52 wherein is shown a die structure 220 having openings 222 therethrough and covered with a fine wire screen 224 as shown. The wire screen is held in place by a clamp ring 225 and the entire die structure is mounted in a suitable die carrier 228 for periodic immersion in a liquid-fibre mixture in a way well known in the art as above discussed. Preferably, ribs 226 are provided in the bottom of said die forming depressions having posts 227 therein for forming perforations in the article.

Associated with the forming die structure 220, when it is in forming or molding position, is a grid-like structure generally indicated at 230 which consists of an edge reinforcing ring 232, and a plurality of distributing cavities or chambers 234 spaced from one another by openings 235, which chambers communicate to certain areas of the surface of the forming die 220 by means of openings 236 therein. Suitable liquid-fibrous and/or other mixtures can be supplied to the various chambers 234 by any suitable means such as a manifold 238, to which the liquid materials can be supplied by any suitable means such as a pipe 239.

The ring 232 provided to reinforce the edge of the article is connected to the internal liquid distributing structure 230 by means of a series of vanes 233, these being located at an angle or incline as indicated in FIG. 51. As the liquid-fibre mixture is drawn to the surface of the die by suction applied to the rear face of this die, the flow of liquid mixture through the space between the vanes 233 tends to deflect this mixture lengthwise or crosswise of the container, thereby effecting better strength distribution of fibres at the edge of the container and on its side and end walls.

In operation, the forming or molding die 220 is immersed in a liquid-fibre mixture by any satisfactory means well known in the art, and suction is applied to the rear face of this die. At the same time, the edge ring 232 with the other structure illustrated in FIGS. 50–52 is in place and the initial fibrous deposit, as far as the edge and side walls of the article are concerned, is drawn through between the ribs 233 and deflected as previously described, and, also, through the openings 235 between the chambers, thus providing a liquid-fibre mixture for depositing over the entire surface of the die during the initial stages of formation. At some predetermined time during this formation, a secondary liquid-fibre mixture is inserted through pipe 239 and manifold 238, introduced into chambers 234 and ejected towards and adjacent to the depressed areas of the die surface between ribs 226 through openings 236. At the same time, the initial fibre mixture or primary mixture is continuing on the rim and side walls of the article, and also on the rib structure or raised portions 226 of the die, which are for the purpose of defining a series or plurality of separate areas or portions of the bottom of the container, in the depressions of which can be deposited about posts 227 by the secondary means already described, a plant growth or other material.

When the general or main fibre structure has been built up around the edge, rim and rib portions of the container, and a sufficient amount of secondary fibrous or growth material has been deposited in the several pockets or depressions in the die, the entire structure is removed from the liquid-fibre mixture, and flow of secondary mixture through pipe 239 and chambers 234 and then openings 236, is cut off. As formation is usually in a vertical or upward direction, the cutting off of the secondary mixture from pipe 239 automatically keeps the chambers full, without any of this mixture escaping from the chambers.

The article so formed as shown in FIGS. 53 and 54 is relatively deep and of rectangular shape with side walls and a bottom having a grid of separating ribs 242 with perforations 244 in the depressions therebetween, and with the secondary fibrous or growth material forming an inner layer 246 within such depressions.

Referring to FIGS. 55 and 56, there is shown another injection type of molding structure having a relatively shallow forming die 250, held in a suitable carrier and moved in a manner similar to that already described relative to the upper accreting or molding die 30. This molding die 250 is provided with openings 252 and is covered with a fine wire screen 253 in the usual manner, this being secured in place by clamp ring 254. An edge reinforcing ring 255 can be utilized, this being similar to the ring as above described. Where it is desired to have an initial deposit of material on the forming die 250, with the provision for having a secondary deposit and insuring the termination of accretion of the primary deposit, the following is a method of operation. The primary forming die or accretion die 250 has the usual edge reinforcing or formation ring 255, and an auxiliary structure consisting of perforated member 260, a valve member 264, and a rod 267 to operate valve member, is initially moved into the position shown generally in FIG. 55. With the entire mechanism immersed in the primary fibre mixture, the primary fibres are drawn by suction up along the edges of the article, as indicated by the arrows, until such time as sufficient primary formation has been accreted on the die 250. At this time, the entire structure 260 is moved upwardly so that the space shown at the arrows is closed, and the relative position of the two members are then as indicated in FIG. 56. The valve member 264 is then moved downwardly by rod 267, permitting the flow of the secondary formation material through the openings 262, which material is accreted on the previously accreted fibrous materials on die 250. When sufficient secondary material has been accreted, valve member 264 closes and the entire mechanism is moved from the tank containing the primary fibrous mixture. To provide for complete agitation of the secondary fibrous mixture, it may be introduced into the chamber through pipe 268, escaping under pressure through pipe 269, a sufficient quantity being circulated to not only provide for elimination of settling out or sedimentation but also to provide for the necessary flow of material at the time the secondary deposit is made.

It is obvious that the operation can be reversed, and the initial deposit can be furnished through the secondary distributing member 260, in which instance, the dies would be in the position shown in FIG. 56, and as soon as enough of this material has been deposited, the entire internal distributing mechanism will be moved downwardly to permit a flow of the fibrous material from the tank in which the die has already been immersed to complete the accreted fibre deposit.

When a sufficient quantity of material has thus been supplied to chamber 270, the valve 264 is closed by upward movement of rod 268 and the entire member 260 with the valve member 264 therein is moved downward as shown in FIG. 55, and, at the same time, the stock level is raised so that the die 250 is immersed in the tank in the fibre mixture the same as has been previously described relative to die 20 and formation by suction from a different fibre mixture continues until sufficient thickness of fibre deposit is built up by suction on the surface of die 250.

The opening of the valve member 264 is clearly shown in FIG. 56, the arrows indicating the flow of material from the chamber within said member into the chamber 270, the general flow being indicated by arrows, at which time the pressure is continually applied to pipe 268 and recirculation through pipe 269 is cut off.

FIG. 57 illustrates the positon of the die 250 after the member 260 has been moved downwardly out of position, and fibrous materials from the tank are being accreted on die 250 by suction. The level of the fibre mixture in which the die 256 is immersed, is indicated generally at 272. The methods by which this mechanism just described can be utilized and the products which it is capable of producing, will be described in more detail later.

The operation as illustrated by FIGS. 55–57 can be reversed from that previously described, in that an initial deposit can be suction-formed on die 250 by being immersed in a liquid-fibre mixture as shown in FIG. 57. After a sufficient or desired deposit has been accreted on the surface of die 250, the member 260 can be moved as previously described in the position shown in FIG. 56, thereby cutting off any future flow of fibre mixture from the tank and subsequently some other mixture having different characteristics from that originally deposited, can be ejected through the openings 262 as indicated in FIG.

56, to complete the accretion of a composite article. At the same time that the member 260 contacts the ring 255 to close off the space between this chamber and the die, the level of the liquid mixture 272 is dropped below the die 250 so that the only additional material which will be deposited on the die 250 is that ejected from the member 260 through the openings 262 into the space 270. This accretion, either from the member 260 initially, or from the mixture at 272, can be formed to any desired thickness, and the subsequent or secondary deposit also can be formed to any desired thickness, thereby producing a composite article of unique and useful characteristics.

It is further contemplated that apparatus such as that shown in FIGS. 55 and 56 and above described might well be used as a tankless machine, wherein a single section of material might be accreted on die 250 by successively engaging a rotatably mounted series of such dies by hollow member 260 and operating valve member 264 thereof to inject mixture to be accreted on the die as is above described. Furthermore, due to the sealing between said member 260 and ring 255, or sealing between it and ring 251 in the absence of an edge forming ring, such die structure may be used in a position inverted from that shown to eliminate problems of loss of material.

It is sometimes desirable to manufacture products on the same machine, where the thickness of the wall or the weight of the article is different, either due to the character of the articles being produced, or for some other reason, even though the articles are produced from the same liquid-fibre mixture.

The methods disclosed herein also provide a means for controlling the weight of one group of products while it is being suction-formed relative to another group of products being suction-formed at the same time and from the same liquid-fibre mixture. To maintain a difference of weights, the liquid-fibre mixture is regulated so that the heaviest weight or thickness of article will be formed on any of the desired forms or dies which may be then utilized. For other articles on which it is desired to have a thinner wall or a lesser weight, dilution water can be introduced by any of the arrangements illustrated and described herein, thereby effecting a reduction of the fibre deposit on the die or dies where such dilution is utilized.

This makes for flexibility of machine operation, particularly machines having high production and where a considerable number or groups of numbers of different articles can be produced at the same time. This affords means for establishing a relative ratio of weights of different sizes or kinds of products produced at one time from the same liquid-fibre mixture by the introduction of dilution water employing the apparatus and the methods heretofore described.

One essential feature of this invention is the provision of methods and apparatus for producing a strong, rigid, molded structure from ordinary and readily available fibrous materials, without the use or addition of expensive binder or reinforcing materials such as resins, special binders, or expensive fibrous materials. Where fibrous materials are formed or accreted under suction alone, the formation is relatively loose, which formation is useful and even desirable for articles such as pie plates or certain containers or receptacles for foods, since such fibrous formation readily absorbs the excess shortening or other material commonly used in pie crust, and, also, is frequently sufficiently absorbent to take up the juices or liquids from various other foods which may be packed in various types and sizes of containers. However, the simple suction accretion process produces a product which is variable due to the density and character of the fibrous materials employed, and fails completely to provide structural stability and strength, and under certain conditions does not provide either the strength or liquid-holding characteristics necessary for packaging certain materials, or the absorbent characteristics which are desirable for packaging other products and materials.

For providing strong molded structures, it is necessary that there be a firm, compact and closely interlaced bond between the various fibres making up the molded product, which strong, firm, interlacing cannot be readily obtained by the ordinary suction accretion process. The word "integralization" is descriptive of the method utilized in various forms in my machine and processes for producing certain types of molded structures, such word being defined as the method by which a close, compact fibre bond is obtained between individual adjacent fibres in a fibrous structure. I may obtain such integralization of the fibre structure in at least three different ways as disclosed in the methods and mechanism herein described.

First, I may integralize a freshly formed, accreted molded fibre article by compressing the fibres previously accreted uniformly and at right angles to the forming die on which they were accreted, while the accreted mass contains substantial amounts of liquid, said pressure being applied at a rate which will permit the liquid to be redistributed throughout the accreted fibrous mass, thereby redistributing the fibres making up such mass, into a closer, interlocked and interbonded relationship. The excess liquid which may be expressed from the mass during the integralization process is drawn off by suction through the die 20.

It is important that the accreted fibrous materials, regardless of the method by which the fibres have been produced on the upper die, have sufficient liquid content when they reach position V (FIG. 1), so that the integralization process can be effectively performed. As the liquid content of certain materials is drawn away from these materials by suction faster than others, it may be desirable or necessary to add liquid to the accreted article at station V, prior to the operation of the integralization mechanism. This can readily be done as indicated in U.S. patent application Ser. No. 636,804, filed January 28, 1957, and consists of spraying or other apparatus for adding liquid to the fibrous mass just prior to the operation of the integralizing mechanism.

It is equally important that the redistribution of the liquid content of the liquid mass be effected at a rate which will result in best reorientation of the fibres of this accreted mass. If the operation is performed too rapidly, the flow of the liquid will disrupt the interlocking of the fibres and result in an article having weak areas or sections. If performed too slowly, the liquid may have left the accreted fibres too early, thereby preventing their reorientation and redistribution. The integralizing process operated in proper timing with the rest of the mechanism and with the proper liquid content of the accreted mass, effects a marked increase in article strength and serviceability by a better interlocking and intermeshing of the fibres and of all other materials from which the article has been formed.

A second method by which integralization can be effected is to form a molded article or shape on two cooperating dies from the same fibre mixture, and assemble each accreted section together, either while suction formation is still in progress, or immediately thereafter. Such a method is desirable to form a sturdy structure, particularly of fibres which accrete slowly under simple suction. It also has a further advantage of having a wire pattern on both sides of the article surface. The liquid remaining in the suction accreted sections can be expressed through two drainage dies instead of one, as in the case above described, which enables a more rapid integralization of the accreted fibrous materials than might otherwise be possible.

A third method is to accrete by suction, fibrous materials on separate dies and from separate fibre mixtures in separate tanks and to assemble these accreted sections while each section contains a substantial amount of liquid. In this case, it is desirable to express the liquid from the accreted sections in one direction, or toward the die on which the accreted and integralized section is to be retained.

Integralization can also be accomplished to a considerable degree by the use of a non-foraminous die which is preferably operated while the primary deposit is being accreted on a single die. This operates on the accreted mass where it contains the maximum amount of liquid, and is sometimes more efficient in integralizing the fibres with each other than methods which are performed when the fibre mass contains less liquid.

It is obvious from the showing in the drawings and from the appended description that the above methods of integralization can be used in combination with each other to effect certain desirable results and produce certain types of products.

In the first instance, it is necessary to have a sufficient amount of liquid in the fibrous mass so that a substantial flow of liquid will occur completely through the mass to assist in the fibre rearrangement.

The fibrous materials themselves should preferably have very substantial length as compared to fibre size with a minimum of short fibres or round fibrous particles, or parts of fibres which have been damaged or cut by processing. Preferably, the surface of the fibres should be somewhat roughened or abraded so that when they are rearranged by the integralizing process they will interlock firmly and rigidly one with the other.

Of the two elements which work together to form a strong integralized article, the most important is the liquid flow and fibre rearrangement; second, the strength, size, and character of the fibres themselves.

In the formation of certain products by the suction-molding methods, and particularly where reasonably slow stocks are employed or where the flow of water through the fibres as they are being deposited is relatively slow, two methods herein disclosed are available to increase the rapidity of the accumulation or accretion of sufficient fibrous material on the die or dies, one being the employment of two dies operating simultaneously in the liquid pulp mixture, augmented, if necessary, by pressure formation during the latter part of the formation period. The second is to form an article of a relatively high ratio of fibre to water, and of integralizing the article by pressure applied to the freshly deposited material to which a substantial quantity of additional liquid has been added so that the deposit held on the die by suction is flowable, and the expression of water by pressure from this flowable mass integralizes or interlocks the fibres in a strong interlocked and interlaced arrangement. This reduction of the water content of the suction-deposited mass, which water content flows through the mass as it is expressed therefrom, produces an article having greatly increased strength and rigidity. It also reduces warpage or other dimensional changes during subsequent drying or refinishing treatments.

For providing integralization of the multi-section article, special means is provided adjacent to station V of the upper forming drum. Such means comprises an expansible mechanism 110 mounted on frame 12 for reciprocating movement radially of an upper forming die at station V by suitable means such as a hydraulic cylinder 112, such means, as best shown in FIG. 8, including a foraminous core 114 with a rubber or other elastic covering 115 thereover so that the introduction of a fluid under pressure in any suitable manner (not shown) operating in timed relation to the forming wheel, will expand such rubber covering. The use of such means serves to thoroughly integralize the accreted fibres one with the other, and expresses from the fibre mass the excess liquid accumulated in the fibrous section or sections during the section accretion process. The reduction of liquid content of the fibrous product not only serves to provide a stronger and more rigid article, but also reduces the amount of liquid which must be evaporated by a subsequent process, such as drying.

Figure 58:
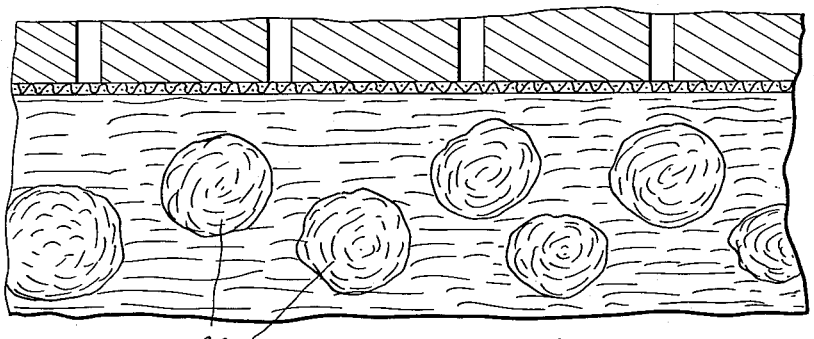
FIGS. 58–60 are illustrative of the fibrous structures produced at various stages in the manufacture of a multi-section integralized article such as that of FIGS. 64 and 65.
Figure 59:
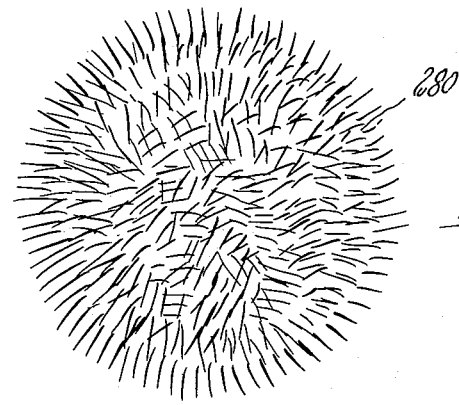
Figure 60:
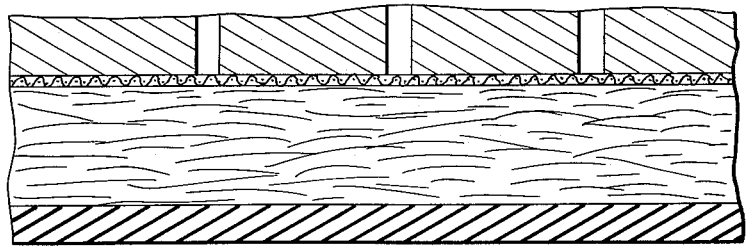

FIGS. 58–60 show diagrammatically the above discussed integralization process. Thus, in FIG. 58 is shown the ordinary suction or vacuum accretion of fibres which are relatively loose and accompanied, particularly when accreted from slow stocks, by a bunching or "flocculation" of fibres as shown at 280. Since the fibres in each of these bunches is generally parallel to the surface of the bunch, they are not particularly well bonded or interlocked with each other and hence tend to weaken the article, in many instances to a substantial extent.

Nevertheless, I have found that, since each of these bunches is loosely formed and contains a relatively large amount of water, if pressure is applied to them relatively slowly at a predetermined value and for a predetermined time, the resulting flow of water from the bunch causes the agglomerated fibres at the outside of the bunch to be aligned generally radially of the bunch, that is, perpendicular to the surface thereof, as shown in FIG. 59, so that the bunches, after the integralization process is complete, become indistinguishable from the mass of fibres to provide a uniform and hence strong fibre formation.

Figure 61:
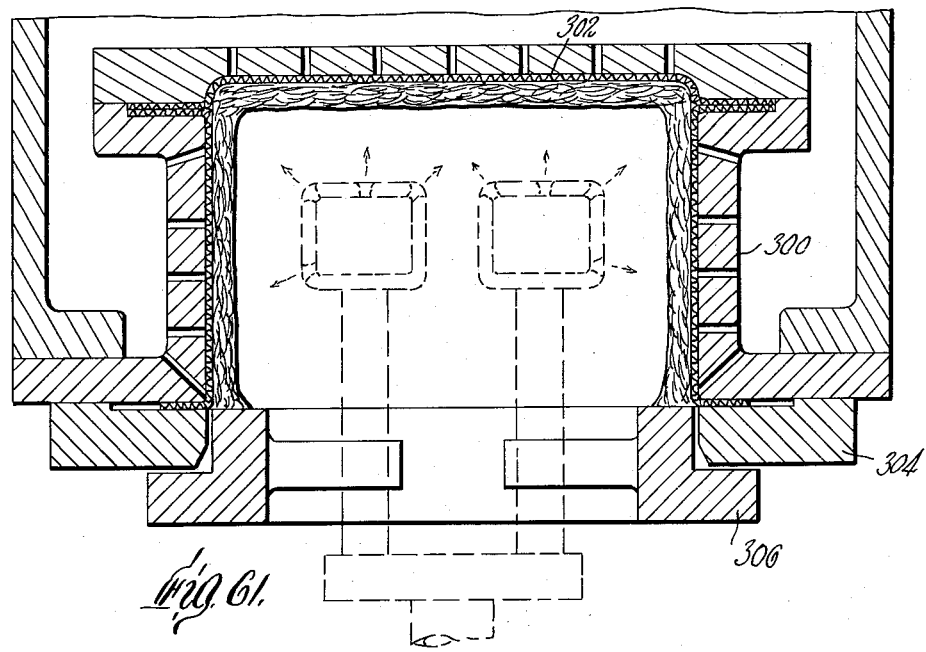
FIG. 61 shows a forming die structure designed to produce an article having vertical or straight sides.
Figure 62:
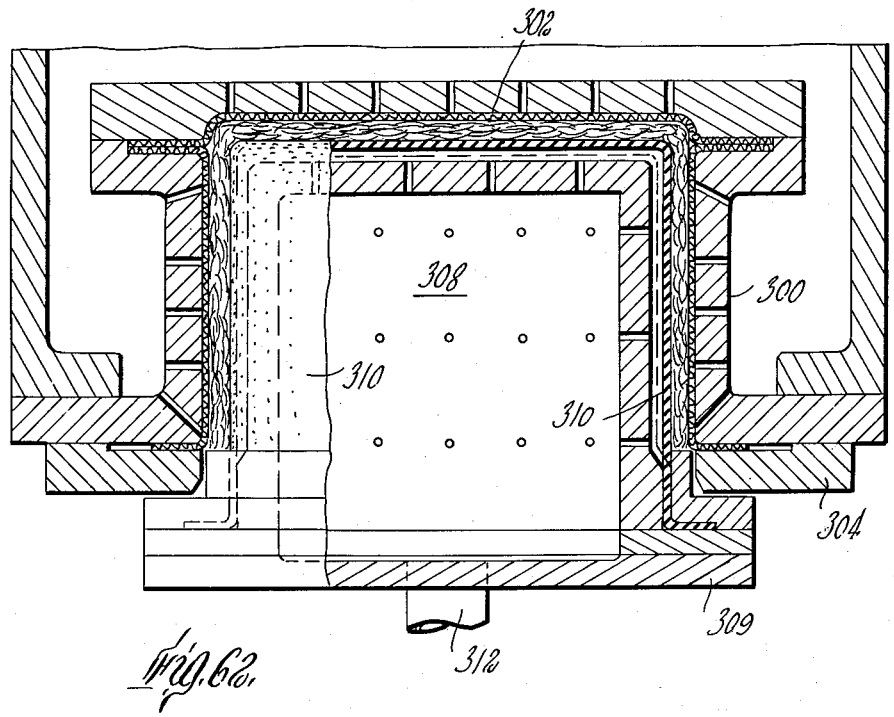
FIG. 62 shows the integralizing die designed for use with the forming die structure of FIG. 61.
Figure 63:
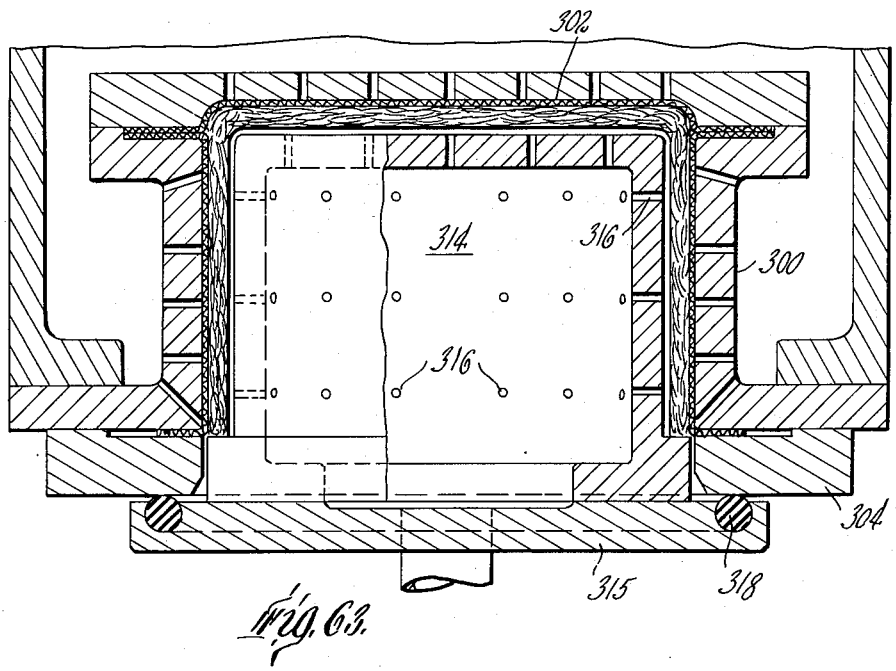
FIG. 63 shows the type of transfer die utilized with the die structures shown in FIGS. 61 and 62.

Furthermore, the mechanism used for integralization may be used, if desired, to make possible the production of molded articles without taper, that is, articles having perfectly straight sides such as shown in FIGS. 64 and 65, and there is illustrated in FIGS. 61–63 the adaptation of the mechanism of this invention above described to the production of such articles.

In FIG. 61 is illustrated a forming die 300 held in a suitable carrier, the forming die being made up in the manner in accordance with the teachings of Patent 2,359,201, which, as shown, the die consists of two parts, with the wire screen covering 302 secured between these two parts. The outer edge of the die covering is secured at the open end of the die by a ring 304. In this showing, the wall of the die is at right angles to the bottom thereof, and also at right angles to the top or edge of the article defined by the edge reinforcing ring 306, the function of which has been described above. The fibre formation is formed by suction in a maner well-known in the art and described elsewhere in this specification, the formation of the deeper areas of the article being controlled by the internal circulating means shown in dotted lines in FIG. 61, and described in detail above. This method provides for a reasonably even fibre deposit over the entire internal surface of the forming die, fibre formation, however, being somewhat loose and a characteristic suction formation, but fairly even in thickness.

After formation and the removal of ring 306, and the positioning of the forming die at position V indicated in FIG. 1, the integralizing mechanism is utilized the same as indicated in FIG. 1, except that the mechanism has a straight side as indicated in FIG. 62, the mechanism itself being indicated at 308, and its flexible covering at 310. A chamber is formed inside of said mechanism 308 by its cover plate 309 and liquid or other pressure means can be introduced through pipe 312, which expands the rubber diaphragm by passing through the die openings. When the integralizing mechanism 308 is inserted in the fibre deposit as indicated in FIG. 62, the expansible die member 310 is contracted by suction tightly against the outer wall of the mechanism 308, thereby providing a space between the diaphragm and the fibre deposit and so avoiding any danger of rubbing or scraping against this deposit while the mechanism 308 is being inserted into the position indicated in FIG. 62.

After insertion, pressure of whatever desired amount is inserted through pipe 312, expanding the diaphragm 310 to the position generally indicated in FIG. 62, causing a flow of water and fibre toward the screen covering, thereby integralizing and unifying the suction-formed deposit and imparting to the article a uniform wall thickness over its entire surface. The expandable diaphragm is then retracted against the wall of the die 308 as shown by the dotted line position of FIG. 62, enabling this die to be withdrawn from the forming die, leaving the fibre deposit still retained therein, without danger of roughing or disturbing the wall structure which has been integralized as above described.

To remove the article from the forming die, a special transfer die 314 is utilized, this die being of the conventional arangement and provided with a cover 315, openings 316 extending through the wall of the die and permitting air and vacuum to be applied to its outside surface.

The size and shape of the transfer die is slightly smaller than the inside size of the integralized fibre deposit previously described. This permits the transfer die to be inserted into the fibre deposit without danger of disturbing or damaging the deposit. Immediately after insertion, vacuum is applied through the openings 316 and compressed air is introduced into the forming die chamber, outside of the die structure 300 passing through the openings in this die, and then the combined application of vacuum to the inside die and pressure to the outside die forces the formed and integralized fibre structure away from the wire screen covering 302 on which it was formed toward the surface of the transfer die 314. The space thus produced between the wire 302 and the inside of the integralized fibre wall is just sufficient to insure the removal of the article from the convolutions of the wire so that as the article is withdrawn by being retained on transfer die 314, the outside of the formed article will not rub against the wire screen covering.

To insure a transfer of the article uniformly over its entire surface from the forming die to the transfer die, I prefer to seal the transfer die to the forming die by means of seal rings 318, thereby preventing any escape of air or vacuum around the rim or edge of the die, but insuring that all of the pressure applied externally and the vacuum applied internally acts uniformly over the article to effect a uniform and efficient transfer.

Practically any size, shape or depth of article can be produced by the process above-mentioned, and it should be pointed out that the mechanism of the machine which has been previously described for moving the transfer die exactly vertically, and the accurate indexing of the forming die in a definite position relative to the transfer die, enables the above operations to be performed efficiently and without article damage.

While I have herein shown internal dies for suction-accreting the fibre deposit, and external dies for integralizing this deposit while still retained in the forming die, it is obvious that the article might be suction-accreted on an external die surface and formed, treated, or integralized by a die operating on the outside or exterior of this fibre deposit. In this case, the transfer die would operate on the outside of the article and the article would be expanded slightly to relieve it from the contact with the wire mesh on the outside of a male forming or suction-accreting die. It should be understood that this invention is applicable to either type of die structure whether the article is formed inwardly or outwardly or whether the diaphragm is expanded outwardly or inwardly.

It will thus be seen that this invention provides a novel machine for producing molded fibre structures of widely varying characteristics and the use of methods and processes having new and novel aspects. In combination, the above enables the production of fibre structures and articles for both old and new uses. Those for old uses having improved characteristics for the various uses for which these articles may be intended, and new articles never before possible to produce by automatic machinery and processes, all of these being combined in a single apparatus capable of wide variation and adjustment without departing inherently from the basic concept or method of operation.

Features of the invention relating to molded fibrous articles have been made subject matter of a divisional application, Serial No. 767,075, filed September 23, 1958, for Pulp Molding Machine.

Modifications of this invention not herein described within the spirit thereof and the scope of the appended claims will occur to those skilled in the pulp molding and related arts.

I claim:

1. A pulp forming machine comprising a succession of suction forming dies arranged in annular sequence and mounted for rotation about a common axis, drive means for advancing said forming dies from position to position, a forming station, a tank adapted to contain a dilute water-fibre mixture at said forming station, a second forming die located at said forming station, means to raise the level of said dilute water-fibre mixture to immerse both said second forming die and one of said annularly arranged forming dies in said mixture at said forming station to accrete a section of fibres on each of said dies, and means to move said one and said second dies into cooperative relationship for transferal and consolidation of the accreted fibrous section formed on said second die to that section on said one die.

2. A pulp forming machine as claimed in claim 1 wherein said means for changing said level includes dump valve means in said tank for lowering said level and a supplementary tank elevated with respect to said tank and having dump valve means for controlling dilute water-fibre mixture flow from said supplementary tank to raise said level.

3. A pulp forming machine comprising a first succession of suction forming dies arranged in annular sequence and mounted for rotation about a common axis, drive means for advancing said first succession of annularly arranged forming dies to and from a first forming station to accrete a pulp layer thereon, and to and from a succeeding transfer station, a first tank adapted to contain a dilute water-fibre mixture positioned adjacent said first forming station, an auxiliary forming die mounted on said first tank, a second succession of suction forming dies arranged in annular sequence and mounted for rotation about a common axis, drive means for advancing said second succession of annularly arranged forming dies to and from a second forming station to accrete a pulp layer thereon, a second tank adapted to contain a dilute water-fibre mixture positioned adjacent said second forming station, means operative when one of said first succession of dies is at said first forming station for moving the level of said dilute water-fibre mixture in said first tank relatively to said annularly arranged dies in said first succession and to said tank mounted forming die to accrete a pulp layer on said tank die and said one of said first succession of forming dies and for moving said annularly arranged dies in said first succession and said tank forming die relatively to one another into cooperating engagement to transfer the pulp layer accreted on said tank mounted die onto the layer accreted on said one of said annularly arranged dies of said first succession of forming dies, means operative when one of said second succession of dies is at said second forming station for moving the level of said dilute water-fibre mixture in said second tank relatively to said one of said second succession of dies to accrete a pulp layer on said one die, and means operative when said annularly arranged die of said first succession is in position at said transfer station for moving said one of said forming dies of said second succession of annularly arranged dies carrying an accreted layer relatively thereto into cooperating engagement to transfer the pulp layer accreted on said one of said forming dies of said second succession onto the layer transferred onto said one of said annularly arranged die of said first succession by said tank forming die.

4. A pulp forming machine as claimed in claim 3, further including integralizing means adjacent a station of said first succession of annular forming dies subsequent to said transfer station for finishing the exposed interior surface of an article held by said annular forming dies of said first succession, said integralizing means including expansible means having a raised pattern for embossing said article, and operating means therefor to position said integralizing means within said article and thereafter to expand said expansible means to smooth and compact said article.

5. A pulp forming machine comprising a succession of suction forming dies arranged in annular sequence and mounted for rotation about a common axis, drive means for advancing said annularly arranged forming dies to and from a forming station, a tank adapted to contain a dilute water-fibre mixture positioned adjacent said forming station, a suction forming die adapted to cooperate with said annularly arranged forming dies mounted in said tank for movement relatively toward and away from an annularly arranged forming die at said forming station, means for effecting said movements of said tank mounted suction forming die, and means for raising and lowering the tank for moving the level of said dilute water-fibre mixture relatively to said annularly arranged and tank mounted forming dies to accrete a plup layer on each of said dies and for moving said annularly arranged and tank forming dies relatively to one another into cooperating engagement to transfer the pulp layer accreted on said tank mounted die onto the layer accreted on said annularly arranged die.

6. A pulp forming machine as claimed in claim 5 wherein said means for moving the level of said dilute water-fibre mixture and for moving said annularly arranged and tank mounted forming dies relatively to one another includes tank reciprocating means for raising and lowering said tank to submerge an annular forming die at said forming station to accrete a pulp layer thereon and then to lower said tank so that said annular forming die with said accreted layer is raised above the level of said mixture, and tank mounted die reciprocating means for raising and lowering said tank mounted die to move said tank mounted die with its accreted layer into cooperating engagement with said annular forming die to transfer the pulp layer accreted on said tank mounted die onto the layer accreted on said annularly arranged die.

7. A pulp forming machine as claimed in claim 6 further including deflector means for preventing damage to the pulp layer accreted on said tank mounted die, said deflector means being mounted for movement into position between said annularly arranged and tank mounted forming dies during movement of said tank to raise said dies above the level of said mixture, and for movement out of said position during movement of said die reciprocating means to transfer said layer.

8. In the pulp forming machine as claimed in claim 6 an edge forming means associated with each said annularly arranged suction forming die mounted for movement into position adjacent the associated said annularly arranged forming die while each said annularly arranged forming die is immersed in said mixture.

9. A pulp forming machine as claimed in claim 8 wherein said edge forming means for said annularly arranged dies has a generally planar surface movable into position adjacent the lower face of an annularly arranged die in forming position.

10. A pulp forming machine as claimed in claim 9 wherein an edge forming means is provided for said suction forming die mounted in said tank having a retractable surface surrounding said outer edge of said die and extending therebeyond, said surface being retracted to inoperative position upon engagement of said dies to transfer said article.

11. A pulp forming machine as claimed in claim 10 further including means for retracting said edge forming means.

12. A pulp forming machine comprising a succession of suction forming dies arranged in annular sequence and mounted for rotation about a forming axis, a forming station including a tank adapted to contain a dilute water-fibre mixture, means to move each of said annularly arranged forming dies in succession to a position above a said forming station, edge forming means mounted below said forming dies and above said dilute water-fibre mixture adjacent said forming station, means to move said edge forming means into contact with the annularly arranged forming die to cover a portion of its edge structure, means to raise the level of the dilute water-fibre mixture at said forming station to immerse said edge forming means and said die in said mixture and to accrete a section of fibres on said die, means to lower the level of said liquid fibre mixture while retaining said edge forming means in position, means to move said edge forming means out of contact with said annular forming die, after the level of said liquid-fibre mixture is lowered, and means to move said annular forming die into a position for removal of said accreted section.

13. In a pulp forming machine as claimed in claim 12 wherein said edge forming means has a generally planar surface movable into position adjacent an end face of said die.

14. In a pulp forming machine as claimed in claim 12 wherein said edge forming means has a generally tubular surface surrounding said outer edge of said die.

15. In a pulp forming machine comprising a succession of suction forming dies arranged in annular sequence, each of said dies having an edge and being mounted for rotation about a common axis, drive means for intermittently advancing said annularly arranged forming dies to and from a forming station, and a tank adapted to contain a dilute water-fibre mixture positioned adjacent said forming station, an edge forming ring extending outwardly perpendicularly to the fibre accreting surface of said die adapted to cooperate with said annularly arranged forming dies and mounted in said tank for reciprocating movement relatively to an annularly arranged forming die at said forming station, and means operative when said annularly arranged die is in non-rotating position at said forming station for moving the level of said dilute water-fibre mixture relatively to said annularly arranged die and for moving said annularly arranged die and said edge forming ring relatively to one another into cooperating engagement to accrete a pulp layer on said die and control the formation thereof at said die edge by said edge forming ring.

16. In a pulp forming machine having a pulp forming die with an outer edge and means for moving said die to and from a forming station for accreting from a liquid-fibre mixture at said forming station a layer of fibrous material on a surface of said die, perforation forming means positioned at said forming station and movable into position closely adjacent to a portion of the surface of said pulp forming die to cover said portion during accretion of said fibrous material on said die to prevent accretion on said portion and thereby form a perforation through said accreted article.

17. In a pulp forming means as claimed in claim 16 wherein said perforation forming means comprises a plurality of spaced post members having end portions closely adjacent to spaced portions of the surface of said die.

18. In a pulp forming means as claimed in claim 17 wherein said end portions have a resilient surface.

19. In a pulp forming machine comprising a succession of suction forming dies arranged in annular sequence and mounted for rotation about a common axis, drive means for intermittently advancing said annularly arranged forming dies to and from a forming station, and a tank adapted to contain a dilute water-fibre mixture positioned adjacent said forming station, a plurality of spaced perforation forming posts adapted to cooperate with said annularly arranged forming dies and mounted in said tank for reciprocating movement relatively to an annularly arranged forming die at said forming station, means operative when said annularly arranged die is in non-rotating position at said forming station for moving the level of said dilute water-fibre mixture relatively to said annularly arranged die and for moving said annularly arranged die and perforation forming posts relatively to one another into cooperating engagement to accrete a pulp layer on said die while preventing formation on portions thereof adjacent said posts.

20. In a pulp forming machine having a tank adapted to contain a liquid-fibre mixture, a pair of cooperating forming dies movable toward and away from one another, said dies having annular means engaging one another to provide a closed chamber at a point in the travel of said dies toward one another prior to their cooperating engagement to pressure-form fibrous material accreted on said dies.

21. In a pulp forming machine comprising a succession of suction forming dies arranged in annular sequence and mounted for rotation about a common axis, drive means for intermittently advancing said annularly arranged forming dies to and from a forming station, and a tank adapted to contain a dilute water-fibre mixture positioned adjacent said forming station, a suction forming die adapted to cooperate with said annularly arranged forming dies mounted in said tank for reciprocating movement relatively to an annularly arranged forming die at said forming station, one of said suction forming and annularly arranged dies having means surrounding said die and extending toward said other die for engagement therewith prior to engagement of the surfaces of said dies, means operative when said annularly arranged die is in non-rotating position at said forming station for moving the level of said dilute water-fibre mixture relatively to said annularly arranged and tank mounted forming dies to accrete a pulp layer on each of said dies and for moving said annularly arranged and tank forming dies relatively to one another into cooperating engagement to engage said means and said die to pressure-form said layer and then to transfer the pulp layer accreted on said tank mounted die onto the layer accreted on said annularly arranged die.

22. In a pulp forming machine having a pulp forming die, means for supplying a liquid-fibre mixture to the surface of said die to accrete fibrous material thereon comprising a member having a perforated surface positioned closely adjacent to and extending over substantially the entire surface of said die, means for feeding liquid-fibre mixture through the perforated surface of said member to the surface of said forming die, and valve means cooperating wtih said member for controlling the feeding of said liquid fibre mixture through said perforated surface.

23. In a pulp forming machine, a pulp forming die having a foraminous surface for accreting fibres from a liquid-fibre mixture and an outer sealing rim, a cooperating distribution member positioned closely adjacent said foraminous surface, said distribution member having a surface with a plurality of perforations therein for feeding liquid-fibre mixture contained therein to said foraminous surface for accretion thereon and an outer sealing rim, and means for moving said pulp forming die and said distribution member relatively to one another to an operative position with said sealing rims in sealing contact while maintaining the surfaces of said die and said member spaced from one another to form a chamber therebetween, a valve member positioned adjacent the surface of said distribution member opposite to said die, said valve member having a surface mating with the adjacent surface of said distribution member and a plurality of perforations therein offset from the perforation in said distribution member, and means for moving said valve member between a closed position in contact with said distribution member and an open position spaced from said distribution member.

24. In a pulp forming machine comprising a tank adapted to contain a dilute water-fibre mixture, a pulp forming die having a foraminous surface for accreting fibres from a liquid-fibre mixture in said tank, and means for moving the level of a dilute water-fibre mixture in said tank relatively to said forming die to accrete fibrous material thereon, a distributing member positioned adjacent said die having perforations arranged for the flow of a dilute water-fibre mixture therethrough and having baffle means positioned at an angle to the flow of said liquid-fibre mixture during accretion providing uniform accretion on said die.

25. In a pulp forming machine comprising a tank adapted to contain a dilute water-fibre mixture, a pulp forming die having a foraminous surface for accreting fibres from a liquid-fibre mixture in said tank, and means for moving the level of a dilute water-fibre mixture in said tank relatively to said forming die to accrete fibrous material thereon, a cooperating distributing member closely adjacent said foraminous surface, said distributing member having a surface which extends over substantialy the entire surface of the distributing member with a plurality of perforations therein for feeding liquid-fibre mixture contained therein to said foraminous surface for accretion thereon, means for moving said pulp forming die and said distributing member relatively to one another to and from an operative position closely adjacent to one another, and valve means for controlling the feeding of liquid-fibre mixture through the perforations in said surface.

26. In a pulp forming machine as claimed in claim 25 wherein said distributing member includes means for circulating liquid-fibre mixture through said distributing member.

27. In a pulp forming machine as claimed in claim 25 wherein said distributing member has a plurality of means throughout its surface communicating through the body thereof for passage therethrough of dilute water-fibre mixture from said tank.

28. In a pulp forming machine comprising a tank adapted to contain a dilute water-fibre mixture, a pulp forming die having a foraminous surface for accreting fibres from a liquid-fibre mixture in said tank and an outer edge sealing rim, and means for moving the level of a dilute water-fibre mixture in said tank relatively to said forming die to accrete fibrous material thereon, a cooperating distributing member positioned closely adjacent said foraminous surface, said distributing member having a surface which extends over substantially the entire surface of the distributing member with a plurality of perforations therein for feeding to said foraminous surface for accretion thereon liquid-fibre mixture contained therein independently of a liquid-fibre mixture in said tank, said distributing member having an outer edge sealing rim cooperating with said forming die sealing rim to define a closed chamber between the surfaces of said die and said member with said surfaces spaced from one another, and means for moving said die and said member relatively to one another between a closed position with said sealing rims closing said chamber to prevent accretion from said tank and an open position providing accretion from said tank.

29. In a pulp molding machine as claimed in claim 28, valve means for said distributing member preventing accretion from said distributing member during at least a portion of the time said die and member are maintained in open position.

30. The apparatus as claimed in claim 28, an edge forming ring positioned between said sealing rims to maintain said sealing contact.

31. The apparatus as claimed in claim 28, a resilient gasket positioned between said sealing rims to maintain said sealing contact.

32. In a method of producing accreted fibrous articles, the steps of accreting a first fibrous material on a foraminous die surface while said surface is submerged in a body of liquid carrying said first fibrous material, and accreting a second fibrous material on said surface while said surface remains submerged in said body by distributing a liquid containing said second fibrous material from a plurality of spaced sources independent of said body distributed over and positioned closely adjacent to said foraminous surface.

33. In a method as claimed in claim 32, wherein said spaced sources are positioned adjacent selected portions of said foraminous surface to accrete said second material substantially only on said selected portions.

34. In a method of producing accreted fibrous articles as claimed in claim 32, further including the step of substantially preventing accretion of said first fibrous material during accretion of said second fibrous material by defining a chamber adjacent said foraminous surface and supplying said liquid containing said second fibrous material to said chamber.

35. In a method of producing accreted fibrous articles as claimed in claim 34, wherein the supply of said second fibrous material is arrested prior to supply to said chamber and accretion of said first fibrous material.

References Cited in the file of this patent

UNITED STATES PATENTS

| | | |
|---|---|---|
| 1,169,064 | Ayerst | Jan. 18, 1916 |
| 1,267,632 | Claussen | May 28, 1918 |
| 1,324,935 | Sims | Dec. 16, 1919 |
| 1,717,988 | Low | June 18, 1929 |
| 1,937,464 | Norstrand | Nov. 28, 1933 |
| 1,974,898 | Rutledge | Sept. 25, 1934 |
| 2,038,721 | Desmond | Apr. 28, 1936 |
| 2,183,869 | Randall et al. | Dec. 19, 1939 |
| 2,234,979 | Randall et al. | Mar. 18, 1941 |
| 2,377,864 | Chaplin | June 12, 1945 |
| 2,460,129 | Ista | Jan. 25, 1949 |
| 2,704,493 | Randall | Mar. 22, 1955 |
| 2,723,600 | Kyle | Nov. 15, 1955 |
| 2,728,169 | Spengler et al. | Dec. 27, 1955 |
| 2,748,672 | Kollmann | June 5, 1956 |

FOREIGN PATENTS

| | | |
|---|---|---|
| 472,544 | Great Britain | Sept. 21, 1937 |

UNITED STATES PATENT OFFICE
CERTIFICATION OF CORRECTION

Patent No. 3,016,090                                                January 9, 1962

Charles J. Chaplin

It is hereby certified that error appears in the above numbered patent requiring correction and that the said Letters Patent should read as corrected below.

Column 11, lines 63 and 64, for "unformly itegralized, that the reorienation" read -- uniformly integralized, that the reorientation --; lines 69 and 70, for "intergralizing" read -- integralizing --; column 13, line 53, for "whise" read -- whose --; line 74, for "condiitoning" read -- conditioning --; column 17, line 36, for "deflciency" read -- deficiency --; column 18, line 31, for "fibous" read -- fibrous --; column 19, line 7, for "diffiuclty" read -- difficulty --; column 23, line 39, for "thitckness" read -- thickness --; column 29, line 29, for "plup" read -- pulp --; column 32, line 28, before "closely" insert -- positioned --; line 30, for "substantialy" read -- substantially --.

Signed and sealed this 19th day of June 1962.

(SEAL)
Attest:

ERNEST W. SWIDER
Attesting Officer

DAVID L. LADD
Commissioner of Patents